(12) United States Patent
Hayashi

(10) Patent No.: US 8,501,662 B2
(45) Date of Patent: Aug. 6, 2013

(54) CATALYST MATERIAL

(75) Inventor: Yasushi Hayashi, Gifu (JP)

(73) Assignee: Denso Corporation, Kariya (JP)

(*) Notice: Subject to any disclaimer, the term of this patent is extended or adjusted under 35 U.S.C. 154(b) by 627 days.

(21) Appl. No.: 12/530,910

(22) PCT Filed: Mar. 19, 2008

(86) PCT No.: PCT/JP2008/055103
§ 371 (c)(1),
(2), (4) Date: Sep. 11, 2009

(87) PCT Pub. No.: WO2008/120582
PCT Pub. Date: Oct. 9, 2008

(65) Prior Publication Data
US 2010/0093529 A1  Apr. 15, 2010

(30) Foreign Application Priority Data

Mar. 20, 2007 (JP) .................. 2007-072627
Nov. 1, 2007 (JP) .................. 2007-284949
Feb. 20, 2008 (JP) .................. 2008-038489

(51) Int. Cl.
*B01J 23/48* (2006.01)
(52) U.S. Cl.
USPC ....... 502/348; 502/347; 502/527.19; 502/414
(58) Field of Classification Search
None
See application file for complete search history.

(56) References Cited

U.S. PATENT DOCUMENTS

| | | | |
|---|---|---|---|
| 3,974,255 A | 8/1976 | Erickson et al. | |
| 5,834,395 A | 11/1998 | Honda | |
| 6,045,765 A * | 4/2000 | Nakatsuji et al. | 423/239.1 |
| 6,260,353 B1 * | 7/2001 | Takahashi | 60/286 |
| 6,314,722 B1 | 11/2001 | Matros et al. | |
| 6,936,232 B2 * | 8/2005 | Gillespie et al. | 423/239.2 |
| 7,011,796 B2 | 3/2006 | Raybone et al. | |
| 7,028,468 B2 | 4/2006 | Brown et al. | |
| 7,146,802 B2 | 12/2006 | Lee | |
| 2003/0167758 A1 | 9/2003 | Brown et al. | |
| 2005/0065026 A1 | 3/2005 | Okubo | |
| 2005/0135977 A1 | 6/2005 | Park et al. | |
| 2005/0135980 A1 * | 6/2005 | Park et al. | 423/239.1 |

FOREIGN PATENT DOCUMENTS

| | | |
|---|---|---|
| JP | 50-67294 | 6/1975 |
| JP | 50-95188 | 7/1975 |
| JP | 58-128128 | 7/1983 |

(Continued)

OTHER PUBLICATIONS

Li et al (NPL: "Structure of (β-AgAIO2 and structural systematics of tetrahedral MM'X2 compounds", Journal of Solid State Chemistry 177 (2004) 889-894).*

(Continued)

*Primary Examiner* — Melvin C Mayes
*Assistant Examiner* — Smita Patel
(74) *Attorney, Agent, or Firm* — Nixon & Vanderhye P.C.

(57) ABSTRACT

In a ceramic honeycomb structure, a catalyst material used for burning soot discharged from an internal combustion engine is supported on partition walls that are inner surfaces of cells. For example, a catalyst material to be used for burning carbon includes silver and alumina as components, and the catalyst material has a dumbbell-shaped O—Ag—O structure. Thus, the ceramic honeycomb structure can burn soot at low temperature using the supported catalyst material without corroding the honeycomb structure.

11 Claims, 24 Drawing Sheets

FOREIGN PATENT DOCUMENTS

| JP | 63-20028 | 1/1988 |
|---|---|---|
| JP | 2-261511 | 10/1990 |
| JP | 5-4135 | 1/1993 |
| JP | 6-47255 | 2/1994 |
| JP | 8-173806 | 7/1996 |
| JP | 11-123330 | 5/1999 |
| JP | 11-169717 | 6/1999 |
| JP | 11-200849 | 7/1999 |
| JP | 2000-15097 | 1/2000 |
| JP | 2000-350933 | 12/2000 |
| JP | 2001-271634 | 10/2001 |
| JP | 2002-255548 | 9/2002 |
| JP | 2002-370030 * | 12/2002 |
| JP | 2002-370032 | 12/2002 |
| JP | 2004-66106 | 3/2004 |
| JP | 2005-7360 | 1/2005 |
| JP | 2005-9454 | 1/2005 |
| JP | 3736242 | 11/2005 |
| JP | 3777696 | 3/2006 |
| JP | 2006-122793 | 5/2006 |
| JP | 2006-239544 | 9/2006 |
| JP | 2006-281155 | 10/2006 |
| JP | 2007-196135 | 8/2007 |
| JP | 2007-296518 | 11/2007 |
| JP | 2008-229608 | 10/2008 |

OTHER PUBLICATIONS

Sheets et al (NPL: "Silver Delafossite Oxides", Inorganic Chemistry, vol. 47 No. 7 2008 pp. 2696-2705).*
Sheets et al (NPL: "Hydrothermal Synthesis of Delafossite-Type Oxides", American Chemical Society, 2006, 18 pp. 7-20).*
Extended European Search Report dated Mar. 3, 2011, issued in corresponding European Application No. 08722478.8-2104.
Nakatsuji et al, "Catalytic reduction system of $NO_x$ in exhaust gases from diesel engines with secondary fuel injection", Applied Catalysis B: Environmental, vol. 17, (1998), pp. 333-345.
England, et al "Structural Studies of Highly Non-Stoichiometric Polycrystalline Sodium and Silver Beta-Aluminas", Solid State Ionics, vol. 6 (Feb. 1982), pp. 21-27, North Holland Publishing Company.
Fino et al., "Open Issues in oxidative catalysis for diesel particulate abatement", Powder Technology, Elsevier Sequoia, vol. 180, No. 1-2, (Jan. 2008), pp. 64-73.
Korean Office Action dated May 18, 2011, issued in corresponding Korean Application No. 10-2009-7019476 with English translation.
International Search Report for PCT/JP2008/055103, mailed Jun. 17, 2008.
Written Opinion of the International Searching Authority with partial translation for PCT/JP2008/055103, dated Jun. 17, 2008.
Neeft, John P.A. et al., "Catalytic oxidation of carbon black—I. Activity of catalysts and classification of oxidation profiles", Fuel, vol. 77, No. 3, (1998), pp. 111-119.
Chinese Office Action dated Aug. 2, 2011, issued in corresponding Chinese Application No. 200880008923.4 with English translation.
Li et al, "Structure of $\beta$-AgAlO$_2$ and structural systematics of tetrahedral MM'X$_2$ compounds", Journal of Solid State Chemistry, vol. 177, Issue 3, Dec. 31, 2004, pp. 889-894.
European Office Action dated Sep. 1, 2011, issued in corresponding European Application No. 08 722 478.8-2104.
Sheets et al., "Silver Delafossite Oxides", Inorganic Chemistry, vol. 47, No. 7, 2008 (Published Feb. 13, 2008), pp. 2696-2705.
Sheets et al., "Hydrothermal Synthesis of Delafossite-Type Oxides", Chemical Materials, vol. 18, No. 1, 2006 (Published Nov. 25, 2005), pp. 7-20.
Chinese Office Action issued for corresponding Chinese Application No. 200880008923.4, dated Jun. 19, 2012.
Chinese Office Action issued for corresponding Chinese Application No. 200880008923.4, dated Jan. 8, 2013.

* cited by examiner

CATALYST MATERIAL

CROSS REFERENCE TO RELATED APPLICATION

This application is the U.S. national phase of International Application No. PCT/JP2008/055103, filed Mar. 19, 2008, which designated the U.S. and claims priority to Japanese Patent Application No. 2007-072627 filed on Mar. 20, 2007, No. 2007-284949 filed Nov. 1, 2007, No. 2008-038489 filed February 2008, and No. 2008-65361 filed Mar. 14, 2008, the contents of which are hereby incorporated by reference in its entirety.

TECHNICAL FIELD

The present invention relates to a catalyst material used for burning carbon.

BACKGROUND ART

In recent years, soot discharged from engine, such as a diesel engine or the like, has become a problem. A purification device including a catalyst made of platinum alumina or the like generally intervenes in an exhaust pipe of the engine to remove soot from an exhaust gas. The purification device accommodates a ceramic honeycomb structure for supporting the catalyst material in a container. The exhaust gas containing soot is allowed to pass through the container, which can remove soot from the exhaust gas.

In general, the ceramic honeycomb structure is recycled in the purification device. That is, soot is accumulated in the honeycomb structure used for purification of the exhaust gas. In a recycling process, excessive fuel is burned to increase the temperature of the honeycomb structure, whereby soot accumulated in the honeycomb structure can be burned and removed. The honeycomb structure supporting the conventional catalyst material made of platinum alumina, however, has to be heated at a high temperature of 600° C. or more so as to burn and remove soot. In the recycling process involving such burning and removing steps, much fuel is wasted so as to heat the honeycomb structure at the high temperature, disadvantageously leading to reduction in fuel efficiency.

Thus, a catalyst material to be supported on a honeycomb structure for decreasing a combustion temperature in recycling is required to be developed. Specifically, for example, an alkali-based catalyst material mainly containing an alkali element has been proposed (see Patent Document 1). The honeycomb structure supporting such a catalyst material can burn soot at a relatively low temperature and be recycled. A silver oxide is known to serve as material having a low temperature activity (see, for example, Non-Patent Document 1).

A catalyst to be used for purifying the exhaust gas is proposed to be oxides composed of a crystal structure with mixed layers into which delafossite-type oxides of different crystal types are mixed (see Patent Document 2, for example). When the oxide is used for burning soot, the oxygen stored by the catalyst between the layers serves to constantly maintain an oxygen concentration, but does not have activity of burning soot at a low temperature.

Patent Document 3 describes a catalyst for promoting combustion of particulates from the diesel engine. Specifically, the catalyst described for the purpose of excellent high-temperature thermal resistance is mainly composed of $BaAl_{12}O_{19}$ in which a part or all of a Ba site is substituted by Ag, and a part of an Al site is substituted by Cr or the like.

Even when all parts of Ba are substituted by Ag, the amount of Ag contained in the catalyst is very small. This is apparent from a chemical formula of $BaAl_{12}O_{19}$. Such an amount of Ag gives the excellent high thermal resistance, but makes it difficult to burn carbon at a low temperature.

Patent Document 4 describes a delafossite-type composite metal oxide which serves well as an oxidation catalyst. However, specifically, only the oxidation catalyst composed of Ag at the A site, and Cr, Fe, and Co at the B site is described.

Patent Document 1: JP-A-2001-271634
Patent Document 2: JP-A-2000-25548
Patent Document 3: JP-A-1990-261511
Patent Document 4: Patent Document No. 1799698
Non-Patent Document 1: John P. A. Neeft et al., FUEL 77, No. 3, pp. 111-119, 1998

DISCLOSURE OF THE INVENTION

Problem to be Solved by the Invention

The catalyst described in the above-mentioned Patent Document 1 can decrease the temperature for burning soot as the concentration of alkali element becomes high. That is, the alkali-based catalyst material has positive and negative correlation between the concentration of alkali element and an activity temperature of the catalyst material. On the other hand, the catalyst material has a positive relationship between the alkali element concentration and an alkali element solubility of the catalyst material in water. That is, as the alkali element concentration of the catalyst becomes high, the alkali element of the catalyst is easily eluted into water.

Accordingly, the alkali element of the catalyst is easily eluted when the catalyst is in contact with the water. Thus, when being brought into contact with the water, the honeycomb structure supporting the catalyst causes the alkali element to be eluted into the water. As a result, since the honeycomb catalyst is easily corroded by the alkali element, the alkali-based catalyst material may corrode the honeycomb structure.

Furthermore, after the alkali element is eluted, the catalyst has its performance degraded, so that the purification of the exhaust gas is not performed sufficiently.

The silver oxide described in the above-mentioned Non-Patent Document 1 releases oxygen owned by decomposition when burning soot once, and thus does not easily return to the original oxide. Furthermore, the silver oxide tends to flocculate after being decomposed, resulting in a great reduction in activity. When being used in an environment including sulfur, an exposed silver disadvantageously becomes silver sulfide and loses activity.

The above-mentioned Patent Document 4 describes good results of the oxidation catalyst which includes Ag at the A site, and Cr, Fe, and Co at the B site. It has not been confirmed however that the above-mentioned oxidation catalyst can be stably used as a combustion catalyst for particulates.

The invention has been made in view of the forgoing problems encountered with the known art, and it is an object of the invention to provide a catalyst material which can appropriately burn carbon at low temperature.

Means for Solving the Problem

First, the inventors have dedicated themselves to studying the reason why an oxidation catalyst including Ag selected as metal of the A site and any one of Cr, Fe, and Co selected as metal of the B site cannot obtain a stable effect as a low-temperature combustion catalyst of carbon.

The dedicated studies of the inventors have found that the reason is due to the use of transition metal, such as Cr, Fe, or Co, at the B site.

That is, the oxidation catalyst described in Patent Document 4 includes the transition metal and Ag connected together with oxygen intervening therein. In such a structure, Ag included in the oxidation catalyst is reduced in action of the catalyst to be separated from the oxygen. During separation, it has been estimated that the oxygen which becomes unstable is stabilized by giving and receiving electrons to and from the transition metal, and that the separation of the oxygen from the transition metal is shifted toward the high-temperature side.

Thus, it has been determined that the oxidation catalyst described in Patent Document 4 can not obtain the catalyst effect at a low temperature.

In order to achieve the above-described object, in an example of the present invention, a catalyst material to be used for burning carbon includes silver and alumina as components, and the catalyst material has a dumbbell-shaped O—Ag—O structure. The catalyst material of the invention is obtained experimentally as a result of the studies of the inventors. By using the catalyst material having the above structure, the carbon can be suitably burned at a low temperature.

According to another example of the present invention, a catalyst material to be used for burning carbon includes silver dispersed into layered alumina. The term "dispersion" as used herein means a state in which a superficial interface with the layered alumina is formed without silver existing in the form of single particle.

Furthermore, the phrase "dispersing the silver into the layered alumina" as used herein means that the alumina and the silver forms a layered structure, for example. The layered structure is a structure in a crystal of the catalyst material, for example, a structure including a lamination of thin pieces.

The term "lamination of thin pieces" as used herein means, for example, the structure of alternate lamination of alumina and silver, each having a thickness of 10 nm or less.

Further, preferably, the above term "lamination" means the alternate lamination of the alumina and the silver in a thickness of 50 nm or more in total.

The catalyst material of the invention is obtained experimentally as a result of the studies of the inventors. The catalyst material containing silver dispersed into the layered alumina can start to burn the carbon at a low temperature, for example, of 300 to 400° C., as compared to a conventional case (see FIG. 2 to be described later).

The catalyst material of the invention does not contain alkali-based material, thereby preventing the corrosion of a carrier, such as the honeycomb structure described above. Further, the catalyst material has excellent resistance to sulfur poisoning.

The catalyst material includes metal silver or silver ion, and alumina which may be alternately laminated to have a lamination cycle of 10 nm or less.

The catalyst materials for use can include a catalyst material having at least three peaks of 200 to 400 $cm^{-1}$, 600 to 800 $cm^{-1}$, and 1000 to 1200 $cm^{-1}$ when a Raman spectrum of the catalyst material is measured. Any other catalyst material having such a Raman spectrum may exhibit the effect of low-temperature combustion as described above.

The catalyst materials with the Raman spectrum described above may include, for example, a delafossite-type $AgAlO_2$.

The catalyst materials exhibiting the low-temperature combustion effect described above may include a catalyst material having an X-ray diffraction spectrum with 3R symmetry which includes diffraction peaks of at least 14.5°, 29.2°, 36.1°, 37.2°, and 41.6° in the X-ray diffraction using Cu—Kα.

The alumina in the catalyst material may be Ag-β alumina.

In another example of the invention, a catalyst material is supported on the honeycomb structure made of the ceramic, and used for burning soot discharged from an internal combustion engine. The catalyst material includes silver dispersed into layered alumina. Also, in such a case, the catalyst material can be provided which can appropriately burn the carbon at low temperature.

In the above catalyst material, an element ratio of silver to alumina is equal to or more than 0.25, preferably.

BEST MODE FOR CARRYING OUT THE INVENTION

Now, preferred embodiments of the invention will be described below. A catalyst material of the embodiments includes a layered structure of alumina and silver. Since the combustion temperature of soot is decreased with increasing density of an interface between the alumina and silver (note that $AgAlO_2$ having a delafossite structure has the highest density), the interface structure between the silver and oxygen of the layered alumina makes the activity of the catalyst material high. Thus, the catalyst material of this embodiment can start burning carbon, such as soot, at a low temperature of about 300 to 400° C.

The layered alumina uses in the embodiments, into which silver is dispersed, can be one having at least three peaks of 200 to 400 $cm^{-1}$, 600 to 800 $cm^{-1}$, and 1000 to 1200 $cm^{-1}$ when a Raman spectrum of the catalyst is measured. The peak of 200 to 400 $cm^{-1}$ is due to vibration in an in-plane direction of a layer of the layered structure, showing that the alumina has the layered structure. The peak of 600 to 800 $cm^{-1}$ is due to vibration of O—Ag—O, showing that silver oxide exists at the interface. The peak of 1000 to 1200 $cm^{-1}$ is not clear at the present time, but can be due to vibration of C—O, showing an oxidation capability of carbon.

That is, the catalyst material of the embodiments may include an O—Ag—O structure of the catalyst containing silver and alumina. The O—Ag—O structure has a so-called dumbbell shape in which three atoms are linearly connected.

The layered structure of alumina and silver are constructed in a crystal of the catalyst material. Specifically, silver metal or silver ion, and alumina can be alternately laminated so as to have a lamination cycle of 10 nm or less. The alumina may be alumina containing silver, that is, Ag-β alumina (see Example 10 to be described later).

The catalyst material may be one having an X-ray diffraction spectrum with 3R symmetry which includes diffraction peaks of at least 14.5°, 29.2°, 36.1°, 37.2°, and 41.6 in the X-ray diffraction using Cu—Kα. The catalyst material with such a Raman spectrum or an X-ray diffraction spectrum for use can be the typical delafossite-type $AgAlO_2$.

The delafossite-type $AgAlO_2$ has a delafossite structure in which oxygen octahedrons with a centered aluminum atom are connected via a common ridge to form alumina sheets with silver ions coordinated between the sheets. The catalyst material with the delafossite structure can burn soot at a low temperature of 300° C. even after the sulfur poisoning process. The inventors believe that the effect is due to the following reason.

That is, in the delafossite-type $AgAlO_2$, the silver is protected by the alumina sheet. Since no silver exists on the surface in an oxidation atmosphere with a sulfur dioxide or the like, the catalyst material is protected from a sulfur component. The delafossite has its surface sticked to reducing material, such as soot, and thus becomes active to exhibit the activity.

The delafossite-type $AgAlO_2$ is manufactured by a method (a first hydrothermal synthesis method) which involves applying a hydrothermal treatment to $NaAlO_2$ and $Ag_2O$ to obtain a delafossite-type $AgAlO_2$ containing an Ag compound, and washing the thus-obtained material by $NH_3$ water. Alternatively, the delafossite-type $AgAlO_2$ is manufactured by a method (a second hydrothermal synthesis method) which involves heating a mixture of $NaAlO_2$ and an Ag low-temperature molten salt (for example, silver/potassium nitrate and the like), and washing the mixture by water to obtain β-type $AgAlO_2$, and applying a hydrothermal treatment to the $AgAlO_2$. The temperature of the hydrothermal treatment is desirably 150° C. or more in order to reduce the amount of impurities contained (see Example 4 to be described later).

The first hydrothermal synthesis method will be specifically described below. First, $NaAlO_2$ and $Ag_2O$ formed by solid-phase synthesis are subjected to the hydrothermal treatment on preferable conditions, for example, at a temperature of 150 to 190° C. for 24 hours to obtain a mixture of NaOH and $Ag_2O/\alpha\text{-}AgAlO_2$ (in which the term "α-" as used herein means the delafossite-type). The mixture is washed by water to thereby obtain $Ag_2O/\alpha\text{-}AgAlO_2$, which is the delafossite-type $AgAlO_2$ containing an Ag compound. The thus-obtained material is further washed by $NH_3$ water to select and remove only the silver oxide thereby to obtain the $\alpha\text{-}AgAlO_2$.

The second hydrothermal synthesis method will be specifically described below. First, a mixture of $NaAlO_2$ and $AgK(NO_3)_2$ is heated to obtain a mixture of $NaK(NO_3)_2$ and β-$AgAlO_2$, which is then washed by water thereby to obtain β-type $AgAlO_2$. Then, the β-type $AgAlO_2$ is subjected to the hydrothermal treatment on preferable conditions, for example, at a temperature of 150 to 190° C. for 24 hours, thereby to obtain $\alpha\text{-}AgAlO_2$. At this time, the Ag low-temperature molten salt is used to prevent precipitation of silver metal.

The following third to seventh hydrothermal synthesis methods may be used as the manufacturing methods of the delafossite-type $AgAlO_2$.

The third hydrothermal synthesis method will be specifically described below. First, NaOH, transition alumina, and $Ag_2O$ are subjected to the hydrothermal treatment on preferable conditions, for example, at a temperature of 150 to 190° C. for 24 hours, and then washed by water thereby to obtain a delafossite-type $AgAlO_2$ containing an Ag compound. The delafossite-type $AgAlO_2$ containing an Ag compound is washed by $NH_3$ water to remove the excessive amount of Ag compound. Thus, $\alpha\text{-}AgAlO_2$ is obtained (see Example 8 to be described below).

The fourth hydrothermal synthesis method will be specifically described below. First, NaOH, alumina hydroxide, and $Ag_2O$ are subjected to the hydrothermal treatment on preferable conditions, for example, at a temperature of 150 to 190° C. for 24 hours, and then washed by water thereby to obtain a delafossite-type $AgAlO_2$ containing an Ag compound. The delafossite-type $AgAlO_2$ containing an Ag compound is washed by $NH_3$ water to remove the excessive amount of Ag compound. Thus, $\alpha\text{-}AgAlO_2$ is obtained (see Example 9 to be described below).

The fifth hydrothermal synthesis method will be specifically described below. First, transition alumina and $Ag_2O$ are subjected to the hydrothermal treatment at a temperature of 150° C. or more in the presence of acetic acid thereby to obtain a sol Ag-boehmite mixture, which is then burned. Thus, a catalyst material composed of, for example, a lamination of Ag and Ag-β alumina is obtained.

The catalyst material can burn carbon fines at a low temperature of about 300 to 400° C. as shown in Example 10 to be described below. Synthesis methods of the catalyst material, which involve burning the sol Ag-boehmite mixture, include the following sixth and seventh hydrothermal synthesis methods.

In the sixth hydrothermal synthesis method, $NaAlO_2$ and $Ag_2O$ are subjected to the hydrothermal treatment at a temperature of 150° C. or more in the presence of acetic acid thereby to obtain a sol Ag-boehmite mixture, which is then burned (see Example 11 to be described later). In the seventh hydrothermal synthesis method, sodium acetate, transition alumina, and $Ag_2O$ are subjected to the hydrothermal treatment at a temperature of 150° C. or more thereby to obtain a sol Ag-boehmite mixture, which is then burned (see Example 12 to be described later).

Any other catalyst material having four peaks of the Raman spectrum may be used as the catalyst material in the present embodiment. For example, a product of the thermal decomposition of the delafossite-type $AgAlO_2$ may be used (see Example 6 to be described later). Alternatively, a combined salt of silver and aluminum may undergo double decomposition to obtain a silver-alumina mixture. For example, the catalyst material may be one obtained by thermally decomposing a composite nitrate material $AgAl(NO_3)_4$ (see Example 7 to be described later).

The catalyst material is preferably composed of particles having a grain size of 0.1 to 20 μm. A catalyst material having a grain size outside the above-mentioned range may be difficult to be supported on the honeycomb structure.

Specifically, when the catalyst material having a grain size below 0.1 μm is supported in use, for example, on the honeycomb structure made of porous material, catalyst particles may enter pores to cause an increase in pressure loss. In contrast, when the catalyst material having a grain size exceeding 20 μm is supported in use on a substrate, such as the honeycomb structure, the catalyst material particles may fall out of the substrate.

The catalyst material can be supported in use on a carrier, such as a ceramic honeycomb structure, for example, by dip coating or the like. The ceramic honeycomb structure includes, for example, an outer peripheral wall, partition walls provided in the form of honeycomb inside the outer peripheral wall, and a plurality of cells partitioned by the partition walls and at least partly penetrating both ends of the structure.

The phrase "cells penetrating both ends" as used herein means that the cells are opened at both ends of the ceramic honeycomb structure, and formed as holes passing through between both ends. All cells may be opened at both ends of the structure. Alternatively, parts of some of all cells may be closed with stoppers or the like at both ends of the honeycomb structure.

The catalyst material is supported by the partition wall serving as an inner surface of the cell in the ceramic honeycomb structure. Since the honeycomb structure of the present embodiment uses the catalyst material including the layered alumina with silver dispersed thereinto, the catalyst material of this embodiment can burn soot at a low temperature without corroding the honeycomb structure, unlike the alkali-based catalyst material mainly containing an alkali element as described in the above-mentioned Patent Document 1. The catalyst material is suitable for use, particularly in a honeycomb member including cordierite crystals.

EXAMPLES

Now, an embodiment will be described more specifically based on the accompanying drawings by referring to the following examples, to which the invention is not limited.

Example 1

In the present example, a delafossite-type $AgAlO_2$ is manufactured as the catalyst material and the catalyst characteristics thereof are evaluated. A manufacturing method of the catalyst material in the present example is the above-mentioned first hydrothermal synthesis method which involves base material synthesis, hydrothermal synthesis, water washing, ammonia washing, second water washing, and drying.

First, in the base material synthesis, a uniform mixture of an alkali salt (for example, sodium nitrate or the like) and an aluminum salt (for example, aluminum nitrate) are thermally decomposed at a temperature of 800 to 1000° C., thereby synthesizing sodium aluminate ($NaAlO_2$) serving as the base material.

Then, the base material synthesized and silver oxide ($Ag_2O$) are encapsulated into a pressure vessel and subjected to the hydrothermal treatment at a temperature of 150 to 180° C., thereby obtaining the delafossite-type $AgAlO_2$ containing the Ag compound. The thus-obtained $AgAlO_2$ is washed by water, by aqueous ammonia, and then by water to be dried, thereby obtaining the catalyst material.

More specifically, the hydrothermal synthesis of the present example will be described below. First, aluminum nitrate and sodium acetate were dissolved into water at a rate of 1:1 to prepare an aqueous solution. The aqueous solution was heated while being stirred to be evaporated to dryness, and then burned at a temperature of 800° C. for four hours, thereby producing sodium aluminate.

Then, the sodium aluminate and silver oxide whose amount of silver was equivalent to that of sodium of the sodium aluminate were dispersed into ion-exchanged water. For example, 8.1 g of $NaAlO_2$ and 11.6 g of $Ag_2O$ were dispersed into 100 ml of the ion-exchanged water. The dispersed liquid was encapsulated into the pressure vessel including a container made of Teflon (trademark). Then, the dispersed liquid was subjected to the hydrothermal treatment at a temperature of 175° C. for 48 hours. The liquid treated was washed by water and filtered three times. A supernatant fluid was dried, and then a residue was analyzed. As a result, sodium carbonate was confirmed.

In contrast, a material remaining after filtration had a dark gray color. As a result of the X-ray diffraction (XRD) analysis, the material was found to be the delafossite-type $AgAlO_2$ and silver oxide. In the following, the delafossite-type $AgAlO_2$ after water washing in Example 1 will be hereinafter referred to as a specimen A0.

The following method for determining an X-ray diffraction spectrum by the XRD measurement will be employed.

That is, the measurement was performed using Rigaku RINT 2000 (manufactured by Rigaku corporation) as a measurement device under the following conditions: radiation source, Cu—Kα; tube voltage, 50 kV; tube current, 100 mA; DS, (½)°; SS, 1°; RS, 0.3 mm; monochromator, 0.02°; step scan and integral time, 0.5 sec.

FIG. 1 is a diagram showing X-ray diffraction spectra of products A0, A1, A2, B1, and B2 by the XRD analysis in Example 1 and Comparative Example 1 to be described later. In FIG. 1, a peak of the silver oxide is indicated by a cross mark. The specimen A0 is confirmed to be the delafossite-type $AgAlO_2$ containing silver oxide.

Then, the delafossite-type $AgAlO_2$ containing the silver oxide was dispersed into 10% aqueous ammonia, so that the color of the solution changes to grey. The product was sufficiently washed by water and dried. The delafossite-type $AgAlO_2$ after the ammonia treatment is hereinafter referred to as a "specimen A1."

The specimen A1 was examined by the XRD, revealing that the silver oxide was removed while only the delafossite-type $AgAlO_2$ remained as shown in FIG. 1. Thus, the delafossite-type $AgAlO_2$ of Example 1 was produced by the above-mentioned treatment with the aqueous ammonia without an excessive amount of silver salt recognizable by the X-ray diffraction.

Comparative Example 1

A specimen B1 was synthesized as the catalyst material of the comparative example in the same way as that of Example 1 except that the washing by the aqueous ammonia was omitted. As shown in FIG. 1, the specimen B1 had the same X-ray diffraction spectrum as that of the above-mentioned specimen A0, and was the delafossite-type $AgAlO_2$ containing the silver oxide.

Comparative Example 2

A sodium thiosulfate was dissolved into a silver nitrate solution in an equimolar amount to that of a silver nitrate contained in the silver nitrate solution. A supersonic wave was applied to a mixture for one hour, and then the thus-obtained black precipitate was filtered, washed by water, and dried thereby to obtain a specimen C of the comparative example. As a result of the XRD, the specimen C was confirmed to be a silver sulfate.

Further, in order to confirm the resistance to sulfur poisoning, a sulfur poisoning process was applied to the above specimens A1 and B1 by use of the same sodium thiosulfate as that used in Comparative Example 2 to synthesize specimens. That is, the specimen A1 was subjected to the poisoning process to obtain a specimen A2, and the specimen B2 was subjected to the poisoning process to obtain a specimen B2.

As shown in FIG. 1, the specimen A2 which was the delafossite-type $AgAlO_2$ obtained after the ammonia washing did not change a crystal structure thereof before and after the poisoning process. In contrast, the specimen B2 which was the delafossite-type $AgAlO_2$ not washed by the ammonia did not change a crystal structure thereof before and after the poisoning process, but slightly changed its color to brown.

Then, catalyst characteristics for purification of exhaust gas of the above-mentioned specimens A1, A2, B2, and C manufactured in Example 1, Comparative Examples 1 and 2 described above were evaluated in the following way. The evaluation was performed by measuring the heat balance and change in weight of carbon fines in heating each catalyst material together with the carbon fines by use of a differential thermogravimetric simultaneous measurement device.

Specifically, first, 100 parts by weight of each specimen and 5 parts by weight of carbon fines were mixed in a mortar. Then, the mixed powder was heated. The heating temperature and change in weight of the mixed powder in heating were measured using the differential thermogravimetric simultaneous measurement device. The differential thermogravimetric simultaneous measurement device for use was EXSTAR6000 TG/DTA made by SII Nanotechnology Inc.

In the above described measurement, while a mixed gas of 10% by volume of oxygen ($O_2$) gas and 90% by volume of nitrogen ($N_2$) gas flowed through the mixed powder at a flow rate of 100 ml/min, the mixed powder was heated at a temperature increasing velocity of 10° C./min. The result of the measurement was shown in FIG. 2. FIG. 2 is a diagram showing a relationship between the change in weight and heating temperature of the respective catalyst materials (specimens A1, A2, B2, and C) in Example 1, Comparative Examples 1 and 2. The change in weight was indicated as a combustion rate.

As can be seen from data of the specimen A1 (indicated by the solid line in the figure) and the specimen A2 (indicated by the broken line in the figure), in Example 1 in FIG. 2, carbon fines were able to be burned in a wide range from a low temperature of about 300 to 400° C. up to 600° C. not only before the sulfur poisoning process, but also after the process.

The specimen B2 of Comparative Examples 1 and 2 described above (indicated by an alternate long and short dash line shown in the figure) had a low-temperature activity as compared to the specimen C composed of silver sulfide (indicated by an alternate long and two short dashes line shown in the figure). However, the build-up temperature of the specimen B2 was equal to or higher than 400° C., which was high as compared to Example 1. The specimen B2 burned carbon fines only in a narrow range of temperature. The details are not completely clear, but the reason for such a difference in characteristics of the specimens even with the same microstructure between Example 1 and Comparative Examples are thought to be due to the presence or absence of the silver compound other than the delafossite material contained, and due to a difference in alumina structure.

Example 2

In the present example, a ceramic honeycomb structure supporting the catalyst material (specimen A1) manufactured in Example 1 is manufactured.

FIG. 3 is a perspective view of the ceramic honeycomb structure 2 of Example 2, FIG. 4 is a sectional view of the ceramic honeycomb structure 2 of Example 2 in the longitudinal direction, and FIG. 5 shows a state in which exhaust gas 10 passes through the ceramic honeycomb structure 2 of Example 2.

As shown in FIGS. 3 to 5, the ceramic honeycomb structure 2 of the present example includes an outer peripheral wall 21, partition walls 22 provided in the form of honeycomb inside the outer peripheral wall 21, and a plurality of cells 3 partitioned by the partition walls 22.

The cell 3 is partly opened at both ends 23 and 24 of the ceramic honeycomb structure 2. That is, parts of cells 3 are opened to both ends 23 and 24 of the honeycomb structure 2, and the remaining cells 3 are closed by stoppers 32 formed on the both ends 23 and 24.

As shown in FIGS. 3 and 4, in the present example, openings 31 for opening the ends of the cells 3 and the stoppers 32 for closing the ends of the cells 3 are alternately arranged to form a so-called checkered pattern. The catalyst material 1, which is the specimen A manufactured in Example 1, is supported on the partition wall 22.

As shown in FIG. 5, in the ceramic honeycomb structure 2 of the present example, the ends of the cells 3 positioned at an upstream side end 23 serving as an inlet side of the exhaust gas 10 and at a downstream side end 24 serving as an outlet side of the exhaust gas 10 have some parts with the stoppers 32 disposed therein and the other parts without the stoppers 32. The partition wall 22 has a number of holes formed therein, through which the exhaust gas 10 can pass.

The ceramic honeycomb structure 2 of the present example entirely has a diameter of 160 mm, and a length of 100 mm, and each cell has a thickness of 3 mm, and a cell pitch of 1.47 mm. The ceramic honeycomb structure 2 is made of cordierite, and the cell 3 has a quadrangular section. The cell 3 can have various sectional shapes, such as a triangular shape or a hexagonal shape.

Now, a manufacturing method of the ceramic honeycomb structure 2 of the present example will be described below. First, talc, molten silica, and aluminum hydroxide were measured so as to provide a desired cordierite composition, and a pore-forming agent, a binder, water, and the like were added to these materials measured, which were mixed and stirred by a mixing machine. The thus-obtained clay-like ceramic material was pressed and molded by a molding machine to obtain a molded member having a honeycomb shape.

After drying, the molded member was cut into a desired length to manufacture a molded member 4 including an outer peripheral wall 41, partition walls 42 provided in the form of honeycomb inside the peripheral wall, and a plurality of cells 3 partitioned by the partition walls 42 and penetrating both ends 43 and 44. FIG. 6 is a perspective view of a contour of the molded member 4.

Then, the molded member 4 was heated to a temperature of 1400 to 1450° C. for 2 to 10 hours to be temporarily burned so as to obtain a temporary burned member 4. The temporary burned member 4 has the substantially same shape as that of the molded member 4 shown in FIG. 6. The temporary burned member 4 is hereinafter referred to as a "honeycomb structure 4".

FIG. 7 is a perspective view showing a state in which a masking tape 5 is disposed at the end 43 of the honeycomb structure 4 in Example 2. FIG. 8 is a perspective view showing a state in which through holes are to be formed in the masking tape 5 in Example 2. FIG. 9 shows a sectional view of the honeycomb structure 4 with through holes 321 formed in the masking tape 5 in Example 2.

Then, as shown in FIG. 7, the masking tape 5 was affixed to the honeycomb structure 4 so as to cover both entire ends 43 and 44 of the honeycomb structure 4. A laser light 500 was applied in turn to parts of the masking tape 5 corresponding to parts 325 where the stoppers are to be disposed on both ends 43 and 44 of the ceramic honeycomb structure 4 using a through-hole forming device 50 with laser emission means 501 as shown in FIGS. 8 and 9. Thus, the masking tape 5 was melted, burned, and removed to form the through holes 321.

Thus, the parts 325 of the ends of the cells 3 to be closed with the stopper 32 were opened by the through holes 321 thereby to obtain the ceramic honeycomb structure 4 with the other parts of the ends of the cells 3 covered with the masking tape 5.

In the present example, the through holes 321 were formed in the masking tape 5 such that the through holes 321 and the parts covered with the masking tape 5 are alternately disposed on both ends 43 and 44 of the cells 3. In the present example, the masking tape 5 used was a resin film having a thickness of 0.1 mm.

Then, talc, molten silica, alumina, and aluminum hydroxide which were main materials of the stopper 32 were measured so as to have a desired composition, and a binder, water, and the like were added to these materials, which were mixed and stirred by the mixing machine thereby to obtain slurry material for the stopper. At the time of slurry preparation, pore-forming material can be added if necessary.

FIG. 10 shows a state in which the honeycomb structure 4 of Example 2 is immersed into the stopper material 320. As shown in FIG. 10, a case 329 containing therein the slurry stopper material 320 was prepared. Then, the end 43 of the honeycomb structure 4 after the hole opening step was immersed into the slurry material. Thus, the appropriate amount of slurry material 320 entered the end of the cell 3 from the through holes 321 of the masking tape 5.

One end 44 of the honeycomb structure 4 was subjected to the same step as that shown in FIG. 10. In such a manner, the honeycomb structure 4 with the stopper material 320 disposed in the parts 325 of the cells 3 to be closed was obtained.

Then, the honeycomb structure 4 and the stopper material 320 disposed in the parts 325 to be closed were simultaneously burned at a temperature of about 1400 to 1450° C., which burned and removed the masking tape 5. Thus, the honeycomb structure 2 was manufactured in which both ends of the cells 3 were provided with the openings 31 for opening the end of the cell 3 and the stoppers 32 for closing the end of the cell 3 as shown in FIG. 4.

FIG. 11 is a diagram showing a state in which the catalyst material 1 is supported on the ceramic honeycomb structure 2 of Example 2. As shown in FIG. 11, the catalyst material 1 manufactured in Example 1 was dispersed into water to manufacture a catalyst dispersed liquid 6. The ceramic honeycomb structure 2 was immersed into the catalyst dispersed liquid 6, and then dried.

The repetition of immersion and drying causes the catalyst material 1 to be supported on the ceramic honeycomb structure 2. Thus, as shown in FIGS. 4 and 5, the ceramic honeycomb structure 2 supporting the catalyst material 1 was obtained.

The ceramic honeycomb structure 2 of the present example supports the catalyst material 1 of Example 1 on the inner surfaces of the cells 3, that is, the partition walls 22. Thus, the use of the excellent characteristics of the catalyst material 1 allows the ceramic honeycomb structure 2 to burn soot at low temperature without causing corrosion.

Example 3

In Example 3, the combustion temperature of delafossite-type $CuAlO_2$ was compared with that of the specimen A1 which was the delafossite-type $AgAlO_2$ manufactured in Example 1. The comparison among both specimens was performed by measuring the heat balance and change in weight of carbon fines in heating each catalyst material together with the carbon fines by use of a differential thermogravimetric simultaneous measurement device in the same way as that shown in FIG. 2.

FIG. 12 is a diagram showing a relationship between the change in weight and heating temperature of the delafossite-type $AgAlO_2$ (specimen A1) and the delaffosite type $CuAlO_2$. The delaffosite type $CuAlO_2$ was manufactured by burning a mixture of copper oxide and aluminum nitrate at a temperature of 1100° C. for four hours. As can be seen from FIG. 12, it is found that the delafossite-type $CuAlO_2$ does not have low-temperature combustion characteristics over a wide range of low temperature, unlike Example 1.

Thus, the combination of Cu—Al which is a catalyst composition described to be good as an oxidation catalyst in the above-mentioned Patent Document 3 is found not to have any effect on low-temperature combustion of particulates. The Ag—Al composition is further found to have good action and effect.

In the above-mentioned Patent Document 3, one group of delafossites is described to have a high oxidation activity for CO, HC, or the like. The above-mentioned examples are not described in Patent Document 3. As shown in FIG. 12, the oxidation activity to soot of $CuAlO_2$ described to be active to CO or HC in Patent Document 3 was compared to the oxidation activity to soot of $AgAlO_2$ in the present example by thermogravimetric analysis. As a result, the $AgAlO_2$ differed from $CuAlO_2$ in activity temperature by 300° C. Therefore, the $AgAlO_2$ apparently has the specific activity.

Example 4

In Example 4, delafossite-type $AgAlO_2$ with different heat histories in different lots were manufactured by the first hydrothermal synthesis. The hydrothermal treatment was performed at a temperature of 175° C. to manufacture a sample of the delafossite-type $AgAlO_2$, which was regarded as the lot 1. The further thermal treatment was applied to the lot 1 at a temperature of 800° C. to manufacture another sample of $AgAlO_2$. Moreover, the hydrothermal treatment was performed at a temperature of 150° C. to manufacture a further sample of $AgAlO_2$, which was regarded as the lot 2. The Raman spectrum of each sample was measured.

The measurement conditions of the Raman spectrum were as follows: estimation device, HR-800 manufactured by HORIBA JOBIN VON corporation; and evaluation conditions, 532 nm, 50 mW, 100 μm hole, a D2 slit, and 600 gr/mm. The measurement results are shown in FIGS. 13, 14, and 15. FIG. 13 shows a Raman spectrum of the lot 1 of the present example. FIG. 14 shows a Raman spectrum of the sample obtained by applying heat treatment to the lot 1 at a temperature of 800° C. FIG. 15 shows a Raman spectrum of the lot 2 of the present example.

Any one of samples has three peaks of 200 to 400 $cm^{-1}$, 600 to 800 $cm^{-1}$, and 1000 to 1200 $cm^{-1}$ as indicated by the arrows shown in FIGS. 13 to 15. As described above, it is also confirmed that each sample can burn carbon fines in a wide range from a low temperature of about 300 to 400° C. up to 600° C.

Example 5

In Example 5, the first hydrothermal synthesis was performed at different hydrothermal treatment temperatures to manufacture samples. The X-ray diffraction spectrum of each sample was measured under the same measurement conditions as described above. The results were shown in FIGS. 16 to 20.

FIGS. 16, 17, 18, 19, and 20 show the X-ray diffraction spectra at hydrothermal treatment temperatures of 125° C.×48 hours, 140° C.×48 hours, 150° C.×48 hours, 175° C.×48 hours, and 190° C.×6 hours. FIG. 21 shows the X-ray diffraction spectrum of the delafossite-type 3R—$AgAlO_2$ obtained by calculating spectra of a 3R type (lamination of alumina of ABCABC) using an atomic distance of a 2H type delafossite (lamination of alumina of ABAB . . . ) of ICSD#300020 in an inorganic crystal structure database (ICSD).

As can be seen from FIGS. 16 to 21, the hydrothermal treatment at a temperature of 125 to 190° C. are performed so as to manufacture the delafossite-type $AgAlO_2$. As shown in FIGS. 16 and 17, however, the hydrothermal treatment at a temperature below 150° C. generates the delafossite-type $AgAlO_2$ containing a great amount of impurities. From this point, the hydrothermal treatment at a temperature of 150° C. or more can manufacture the delafossite-type $AgAlO_2$ which contains as few impurities as possible.

The catalyst characteristics for purification of exhaust gas of the respective samples shown in FIGS. 16 to 20 were evaluated under the same conditions as described above by the differential thermogravimetric simultaneous analysis device. The results were shown in FIGS. 22 to 26.

FIGS. 22, 23, 24, 25, and 26 are diagrams showing relationships between changes in weight and heating temperatures of the delafossite-type $AgAlO_2$ synthesized at hydrothermal treatment temperatures of 125° C.×48 hours, 140° C.×48 hours, 150° C.×48 hours, 175° C.×48 hours, and 190° C.×6 hours, respectively.

As shown in FIGS. 22 to 26, all samples synthesized at the hydrothermal treatment temperatures can burn carbon fines in a wide range from a low temperature of about 300 to 400° C. up to 600° C.

Example 6

In Example 6, the delafossite-type $AgAlO_2$ manufactured by the above-mentioned hydrothermal synthesis was heated at a temperature of 1000° C. for four hours to be decomposed.

FIG. 27 is a diagram showing an X-ray diffraction spectrum of a thermally decomposed material of the delafossite-type $AgAlO_2$ by the XRD analysis. The measurement conditions were the same as described above. As shown in FIG. 27, the X ray can confirm only silver, but the composition of the thermally decomposed material has a ratio of Ag to Al of 1:1 (Ag:Al=1:1).

FIG. 28 is a diagram showing a Raman spectrum of the thermally decomposed material. The measurement conditions were the same as described above. The spectrum has three peaks of 200 to 400 $cm^{-1}$, 600 to 800 $cm^{-1}$, and 1000 to 1200 $cm^{-1}$ as indicated by the arrows in FIG. 28. The thermally decomposed material was observed by an electron microscope. FIG. 29 shows a micrograph of the thermally decomposed material taken by the electron microscope. The thermally decomposed material was confirmed to have a layered structure.

The catalyst characteristics for purification of exhaust gas of the thermally decomposed material were evaluated under the same conditions as described above by the differential thermogravimetric simultaneous analysis device. The result was shown in FIG. 30. FIG. 30 is a diagram showing a relationship between a change in weight and a heating temperature of the thermal decompression material of the present example. As can be seen from the above description, the material can also burn carbon fines at a low temperature of about 300 to 400° C.

Example 7

In Example 7, a composite nitrate was thermally decomposed. Specifically, a silver nitrate and an aluminum nitrate were dissolved into water in an equimolar amount to form a material $(AgAl(NO_3)_4)$, which was then heated up to a temperature of 850° C. to be thermally decomposed.

FIG. 31 is a diagram showing an X-ray diffraction spectrum of the thermally decomposed material of the composite nitrate by the XRD. The measurement conditions were the same as described above. As shown in FIG. 31, only silver and a small amount of α alumina were able to be confirmed by the X-ray spectrum, but the composition of the decomposed material has the ratio of Ag to Al of 1:1.

FIG. 32 shows a Raman spectrum of the thermally decomposed material of the composite nitrate. FIG. 32 also shows a Raman spectrum of a material of the comparative example formed by immersing a alumina into $AgNO_3$ so as to have the ratio of Al to Ag of 1:1 to support the $AgNO_3$ on the α alumina, and by thermally decomposing the alumina at a temperature of 850° C. The measurement conditions were the same as described above.

As shown in FIG. 32, the thermally decomposed material of the composite nitrate of the present example also has three peaks of 200 to 400 $cm^{-1}$, 600 to 800 $cm^{-1}$, and 1000 to 1200 $cm^{-1}$. The thermally decomposed material was observed by the electron microscope. FIG. 33 shows a micrograph of the thermally decomposed material taken by the electron microscope. The thermally decomposed material was also confirmed to have a layered structure.

The catalyst characteristics for purification of exhaust gas of the thermally decomposed material were evaluated under the same conditions as described above by the differential thermogravimetric simultaneous analysis device. The result was shown in FIG. 34. FIG. 34 is a diagram showing a relationship between a change in weight and a heating temperature of the thermally decomposed material of the composite nitrate in the present example. As can be seen from the above description, the material can also burn carbon fines at a low temperature of about 300 to 400° C.

Example 8

In Example 8, the delafossite-type $AgAlO_2$ was manufactured as the catalyst material by the third hydrothermal synthesis.

First, 4 g of NaOH, 5.0 g of transition alumina, and 11.6 g of $Ag_2O$ were dispersed into 100 ml of ion-exchanged water. The dispersed liquid was encapsulated into a pressure vessel including a container made of Teflon (trademark). Then, the dispersed liquid was subjected to a hydrothermal treatment at a temperature of 175° C. for 48 hours. The liquid treated was washed by water and filtered three times. A material remaining after filtration had a dark gray color. As a result of the X-ray diffraction (XRD), the material was found to be the delafossite-type $AgAlO_2$ and silver oxide.

Thereafter, the delafossite-type $AgAlO_2$ containing the silver oxide was dispersed into 10% aqueous ammonia, and subsequently washed by water sufficiently to be dried. Thus, also in the present example, the same delafossite type $AgAlO_2$ as that in Example 1 was obtained.

Example 9

In Example 9, the delafossite-type $AgAlO_2$ was manufactured as the catalyst material by the fourth hydrothermal synthesis.

First, 4 g (grams) of NaOH, 7.8 g of transition alumina, and 11.6 g of $Ag_2O$ were dispersed into 100 ml of ion-exchanged water. The dispersed liquid was encapsulated into a pressure vessel including a container made of Teflon (trademark). Then, the dispersed liquid was subjected to the hydrothermal treatment at a temperature of 175° C. for 48 hours. The liquid treated was washed by water and filtered three times. A material remaining after filtration had a dark gray color. As a result of the X-ray diffraction (XRD), the material was found to be the delafossite-type $AgAlO_2$ and silver oxide.

Thereafter, the delafossite-type $AgAlO_2$ containing the silver oxide was dispersed into 10% aqueous ammonia, and subsequently washed by water sufficiently to be dried. Thus, also in the present example, the same delafossite type $AgAlO_2$ as that in Example 1 was also obtained.

Example 10

In Example 10, a catalyst material composed of a lamination structure of Ag and Ag-β alumina was manufactured by the fifth hydrothermal synthesis method.

First, 11 g of silver oxide, and 5 g of θ alumina serving as transition alumina were dispersed into 100 ml of ion-exchanged water. Then, 6 g of acetic acid was added to and stirred in the dispersed liquid, encapsulated into the pressure vessel, and then subjected to the hydrothermal treatment at a temperature of 175° C. for 48 hours.

The thus-obtained slurry was separated into solid and liquid by a centrifugal separator, so that X-ray diffraction measurement of the solid was performed under the same conditions. The result was represented by an X-ray diffraction spectrum (before burning) indicated by a broken line in FIG. 35. Thus, the solid was found to be a mixture of boehmite and silver.

The solid was burned at a temperature of 600° C. in atmospheric air. The X-ray diffraction spectrum indicated by the solid line in FIG. 35 was a spectrum of the burned material after the burning. From the above noted spectrum, silver was confirmed, but the form of alumina was not clear.

Thus, cross-section TEM observation and electron diffraction were performed. FIG. 36 is a schematic sectional view of a burned material of the present example as a result of the cross-section TEM observation.

As shown in FIG. 36, silver layers 700 and alumina layers 701 were alternately laminated to have a lamination cycle of 10 nm or less. The silver exists as a metal silver or a silver ion. One layer of silver has a thin portion and a thick portion as shown in FIG. 36.

The alumina was confirmed by the electron diffraction to contain Ag in the alumina layer 701. That is, in the present example, the alumina was Ag-β alumina containing therein Ag. The catalyst material of the present example was confirmed to be a catalyst material of a lamination structure composed of Ag and Ag-β alumina.

The delafossite-type $AgAlO_2$ shown in Example 4, the thermally decomposed material of the delafossite-type $AgAlO_2$ shown in Example 6, and the thermally decomposed material of the composite nitrate shown in Example 7 were subjected to the same cross-section TEM observation. As a result, each of the materials were confirmed to be a catalyst material having a lamination structure of silver and aluminum as shown in FIG. 36. The lamination cycles of the respective examples include, for example, 0.6 nm, 5 nm, and 10 nm in Example 4, Example 6, and Example 7, respectively.

Also, in the present example, the Raman spectrum was measured in the same way as that in Example 4. Like the catalyst material of each example, the catalyst material of the present example was confirmed to have a peak of 600 to 800 $cm^{-1}$ and to have an O—Ag—O structure.

The catalyst characteristics for purification of exhaust gas of the catalyst material of the present example were evaluated under the same conditions as described above by the differential thermogravimetric simultaneous analysis device. The result was shown in FIG. 37. FIG. 37 is a diagram showing a relationship between the change in weight and the heating temperature of the catalyst material of the present example. As can be seen from the figure, also in the present example, the catalyst material can burn carbon fines at a low temperature of about 300 to 400° C.

Example 11

In Example 11, a catalyst material composed of a lamination structure of Ag and Ag-β alumina was manufactured as the catalyst material by the sixth hydrothermal synthesis method. In Example 11, the catalyst material was manufactured in the same way as that in Example 10 except that 8 g of $NaAlO_2$ was used instead of θ alumina.

Also in the present example, like Example 10, the use of the lamination structure of Ag and Ag-β alumina can obtain the catalyst material. The catalyst characteristics for purification of exhaust gas of the catalyst material of the present example were evaluated. Thus, the catalyst material was able to burn the carbon fines at a low temperature of about 300 to 400° C.

Example 12

In Example 12, a catalyst material formed of a lamination structure of Ag and Ag-β alumina was manufactured as the catalyst material by the seventh hydrothermal synthesis method. In Example 12, the catalyst material was manufactured in the same way as that in Example 10 except without using acetic acid, in that 8 g of sodium acetate was used instead of acetic acid.

Also in the present example, like Example 10, the use of the lamination structure of Ag and Ag-β alumina can obtain the catalyst material. The catalyst characteristics for purification of exhaust gas of the catalyst material of the present example were evaluated. Thus, the catalyst material was able to burn the carbon fines at a low temperature of about 300 to 400° C.

Example 13

An element ratio of silver to alumina in the layered silver alumina lamination is preferably equal to or more than 0.25. In Example 13, the reason for defining the element ratio will be described below. The reason is based on the following experimental result performed by the inventors.

First, 1.5 g of θ alumina, 0.35 g (x=0.1), 0.70 g (x=0.2), 0.88 g (x=0.25), 1.75 g (x=0.5), 2.63 g (x=0.75) of silver oxide, and 0.18 g (x=0.1), 0.36 g (x=0.2), 0.45 g (x=0.25), 0.9 g (x=0.5), 1.3 g (x=0.25) of acetic acid were respectively added to 100 ml of ion-exchanged water, and then heated in the pressure vessel at a temperature of 175° C. for 40 hours thereby to obtain sol solutions. The thus-obtained sol solutions were dried, and burned at a temperature of 600° C. for 5 hours thereby to form respective specimens. That is, in the present example, each specimen was manufactured by the above-mentioned fifth hydrothermal synthesis method.

The value x in a parenthesis for the weight of each of the silver oxide and acetic acid indicates an element ratio of each of an Ag atom and acetic acid with respect to an Al atom. The composition of each specimen obtained is represented by $xAg/[0.5(Al_2O_3)]$ using the element ratio x of silver to aluminum.

That is, in the present example, the amounts of silver oxide and acetic acid together therewith respect to the amount of θ alumina were changed to manufacture the specimens having the element ratio x of silver to aluminum of 0.1, 0.2, 0.25, 0.5, and 0.75, respectively. The respective specimens with different element ratios x were mixed with 5% by weight of soot to be subjected to the thermogravimetric analysis in the same way as described above. The result of the thermogravimetric analysis is shown in FIG. 38.

In FIG. 38, the lateral axis indicates a temperature (in units of ° C.), and the longitudinal axis indicates a rate of decrease in weight (in arbitrary units). FIG. 38 shows a relationship between the temperature and the rate in decrease in weight of the specimens with the different element ratios x of the silver to the aluminum. As can be seen from the results shown in FIG. 38, when the element ratio x of the silver to the aluminum is equal to or more than 0.25, the larger rate of decrease in weight can be observed at a temperature of 300 to 400° C., so that the good burning can be achieved at low temperature.

Other Embodiments

In the honeycomb structure shown in Example 2, the catalyst materials of Examples 3 to 12 may be supported on the partition walls 22. A method of supporting the catalyst material is the same as that in Example 2 described above. In supporting the catalyst material on the partition walls 22, the catalyst material may be supported on the entire of the partition walls 22, or supported on parts of the walls. Alternatively, a slurry containing the catalyst material may be used to be supported on a honeycomb structure by suction or the like.

The ceramic honeycomb structure may not be limited to those shown in FIGS. 3 to 5. Any other ceramic honeycomb structure may be used which is adapted to support the catalyst material for burning soot discharged from the internal combustion engine.

Figure 1:
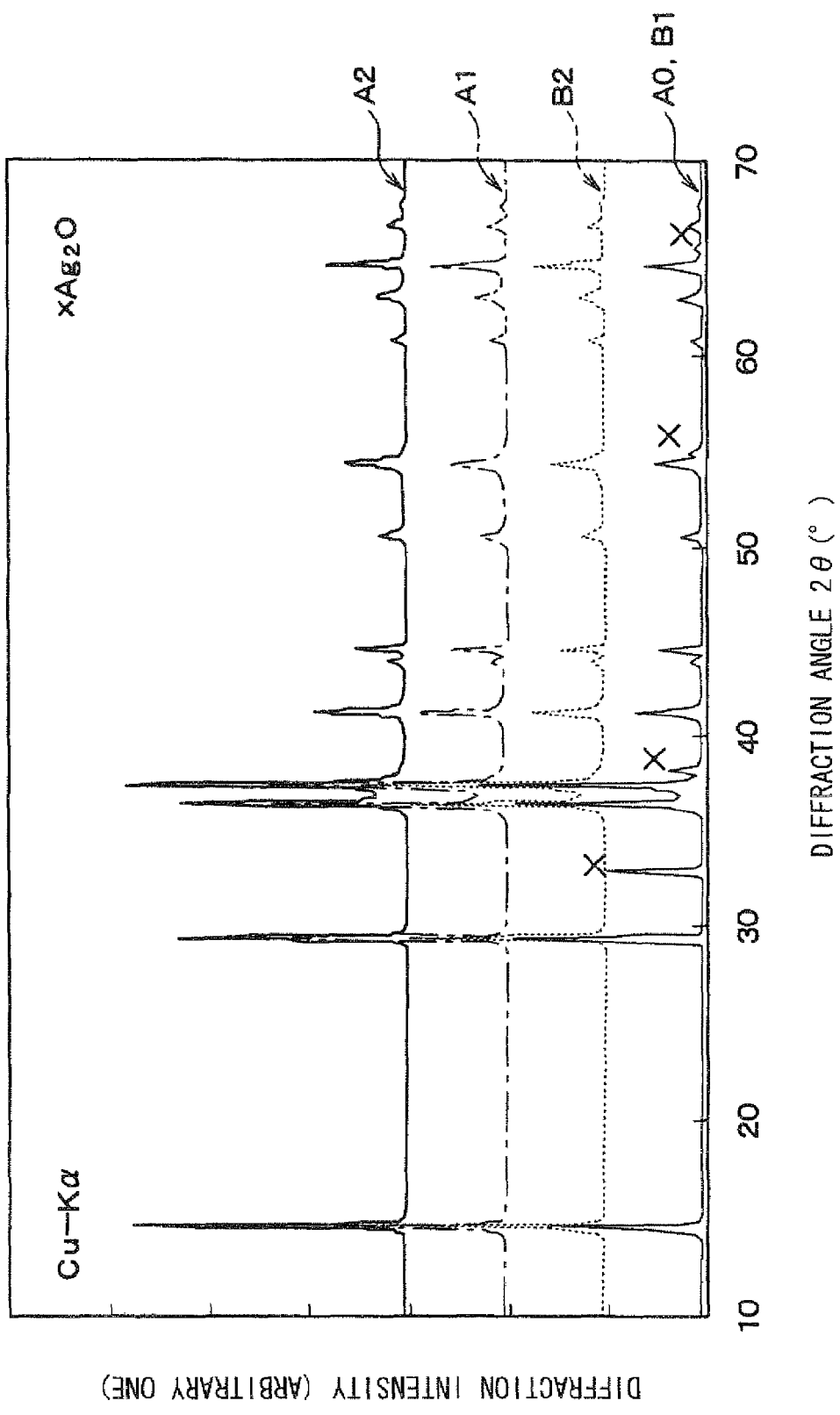
FIG. 1 is a diagram showing X-ray diffraction spectra of products by XRD analysis in Example 1 and Comparative Example 1.
Figure 2:
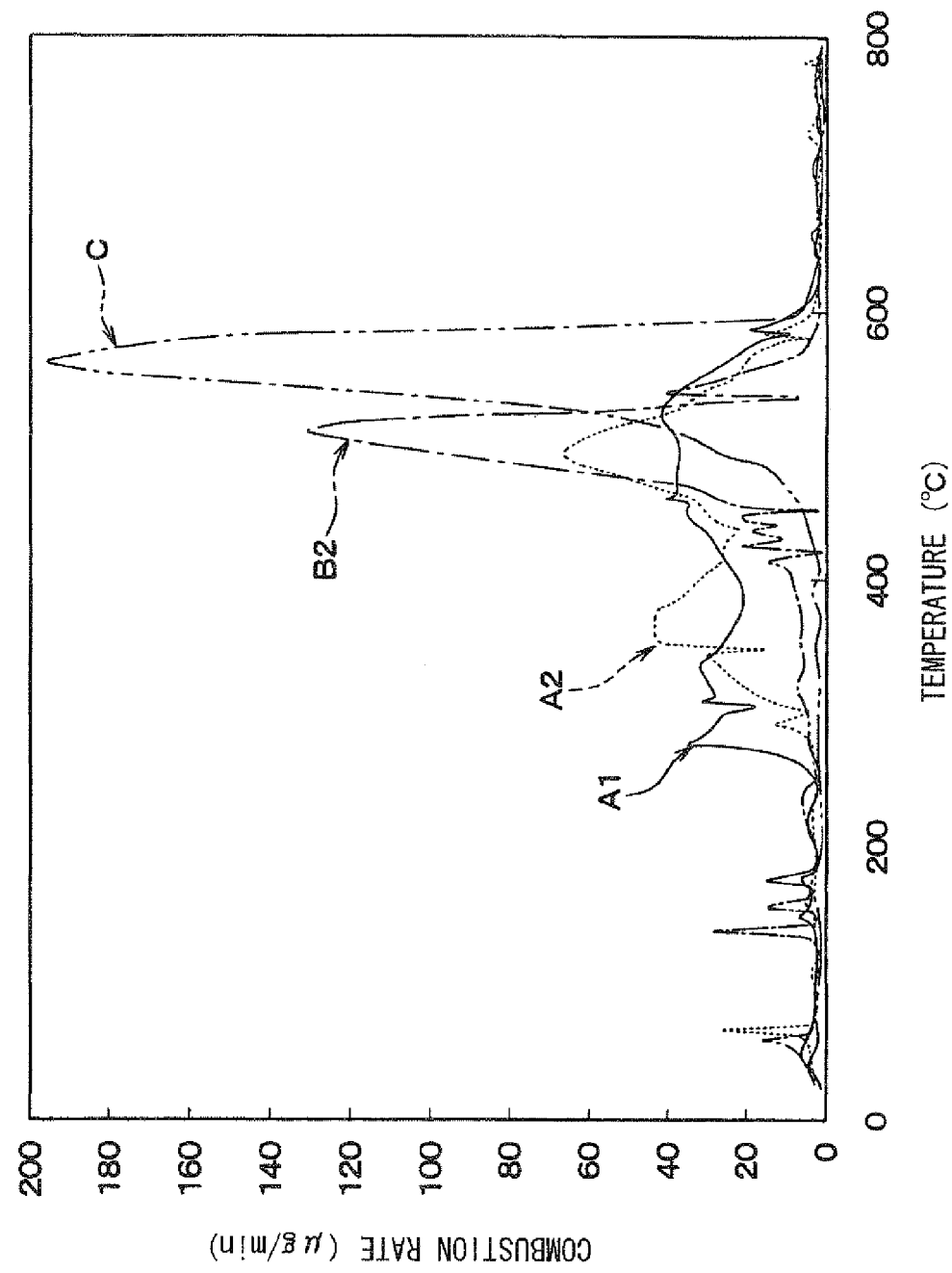
FIG. 2 is a diagram showing relationships between changes in weights and heating temperatures of catalyst materials of Example 1 and Comparative Examples 1 and 2.
Figure 3:
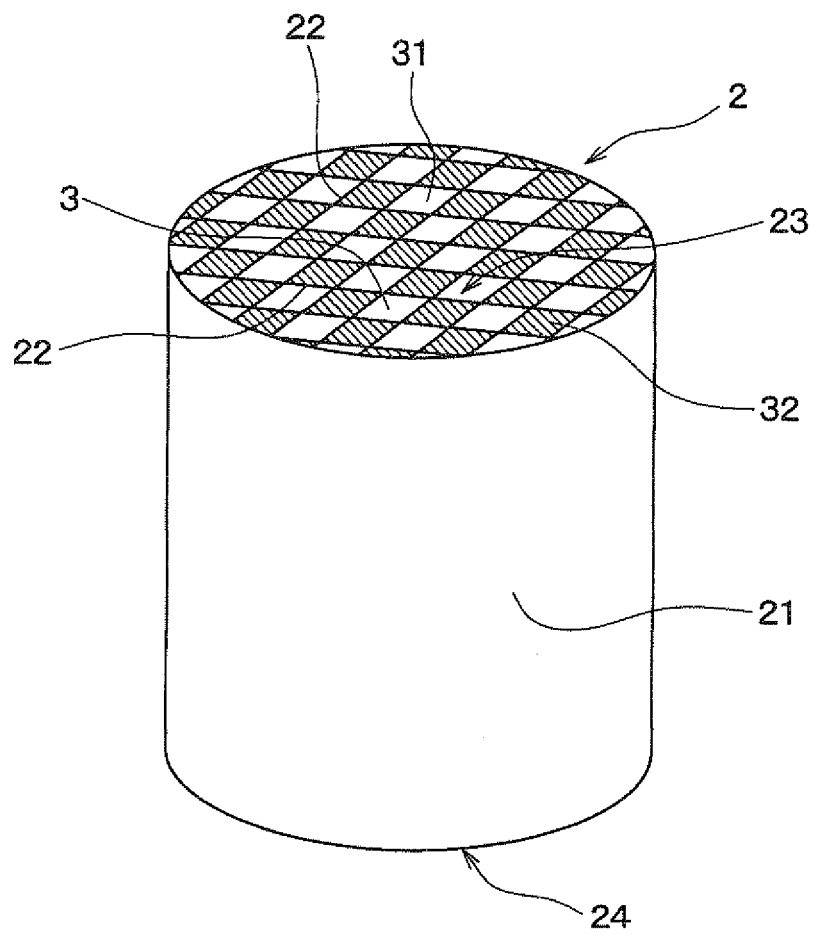
FIG. 3 is a perspective view of a ceramic honeycomb structure of Example 2.
Figure 4:
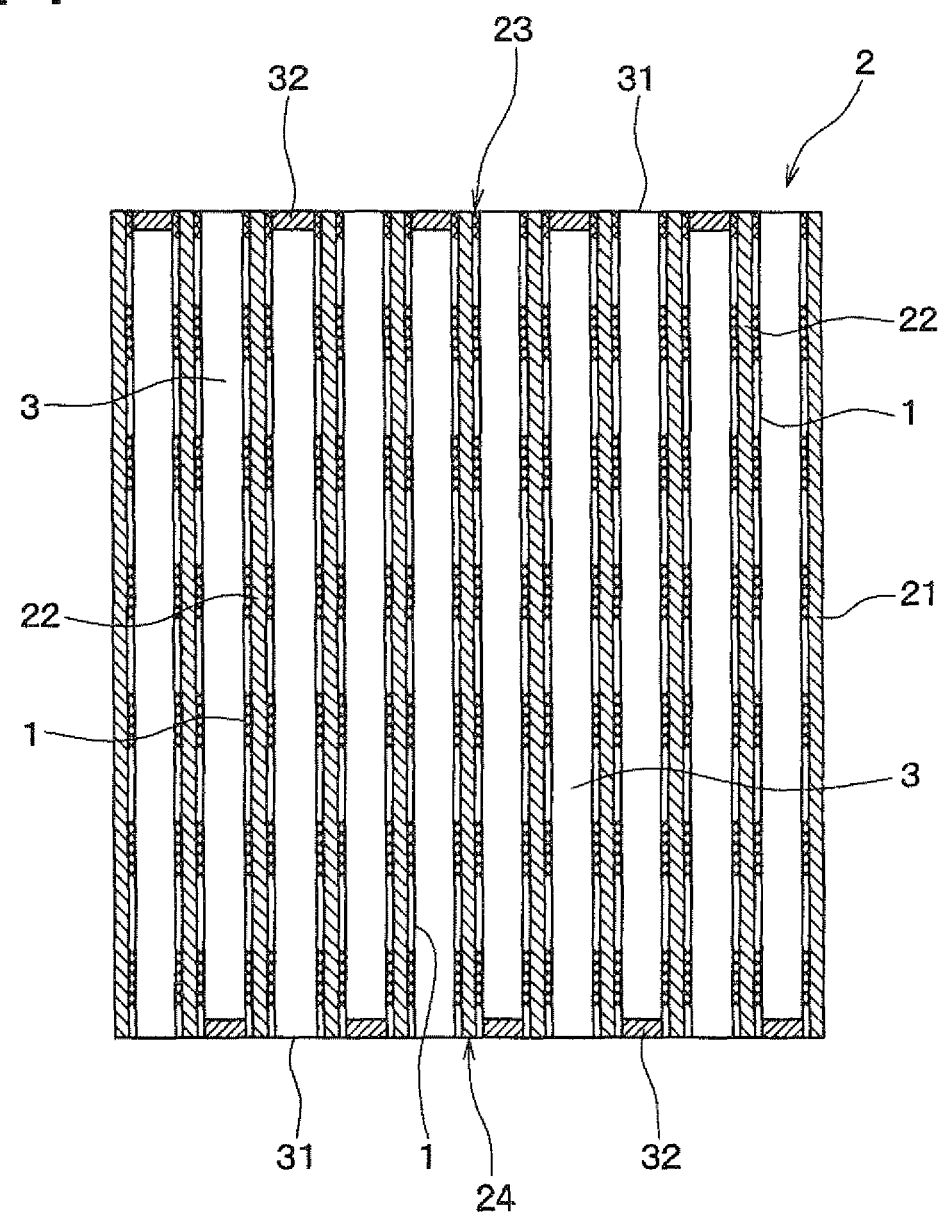
FIG. 4 is a sectional view of the ceramic honeycomb structure of Example 2 in the longitudinal direction.
Figure 5:
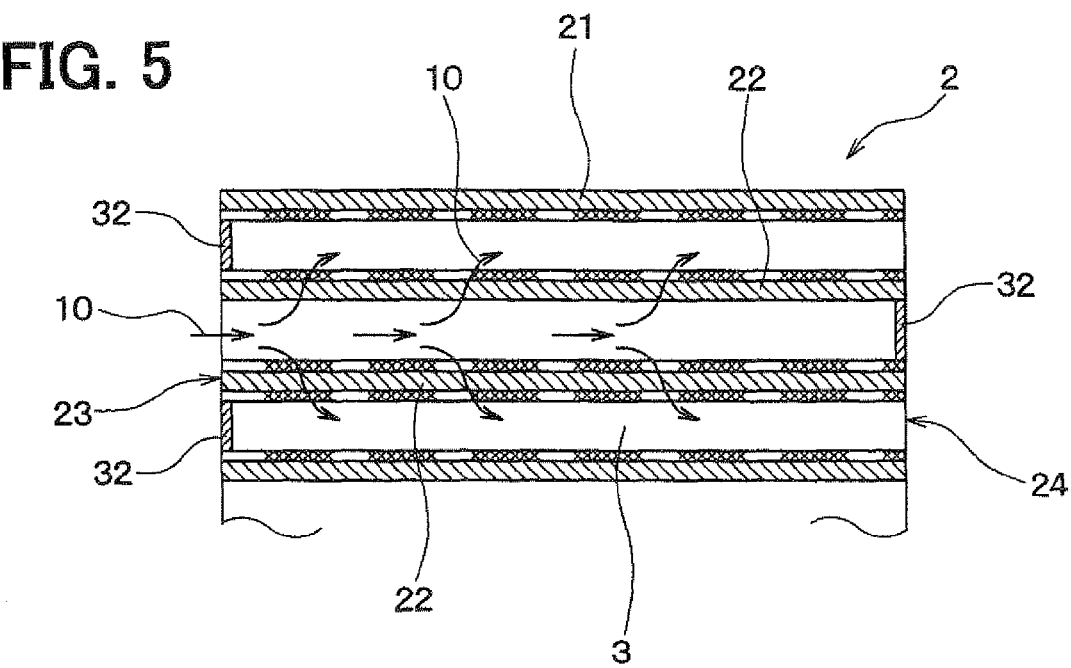
FIG. 5 is a diagram showing a state in which exhaust gas passes through the ceramic honeycomb structure of Example 2.
Figure 6:
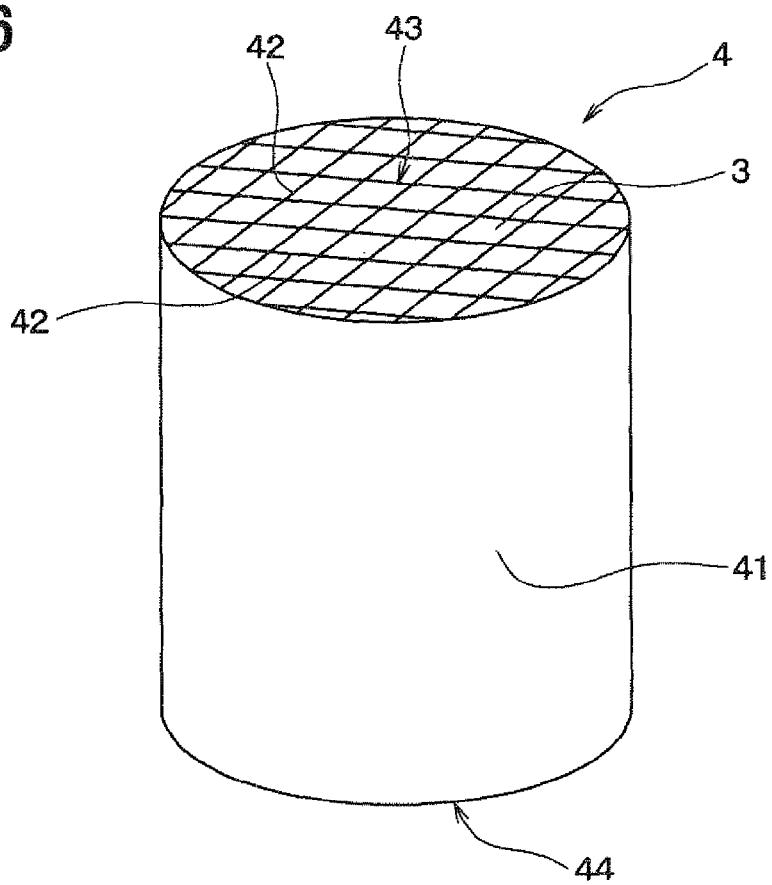
FIG. 6 is a perspective view of a contour of a molded member of Example 2.
Figure 7:
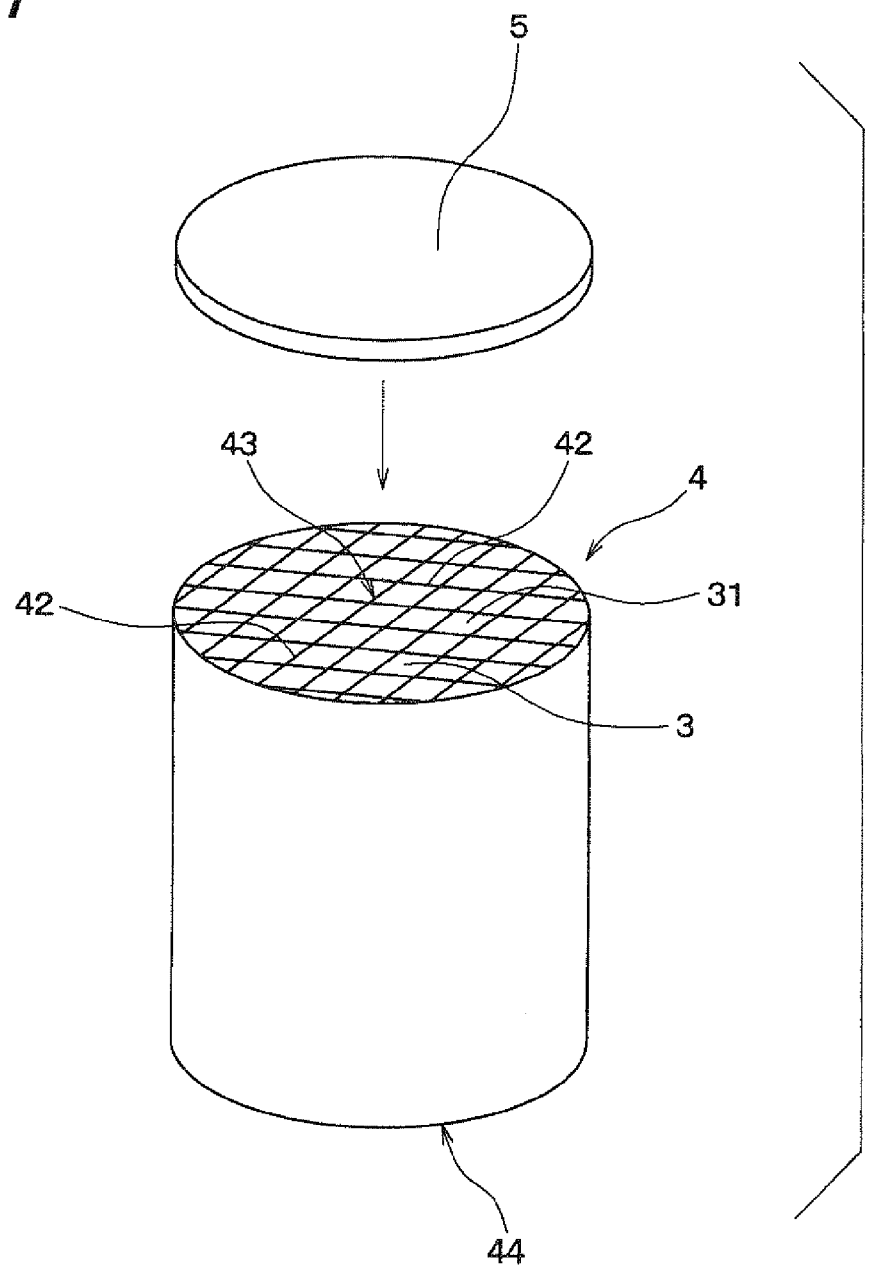
FIG. 7 is a perspective view showing a state in which a masking tape is disposed at an end of the honeycomb structure 1 of Example 2.
Figure 8:
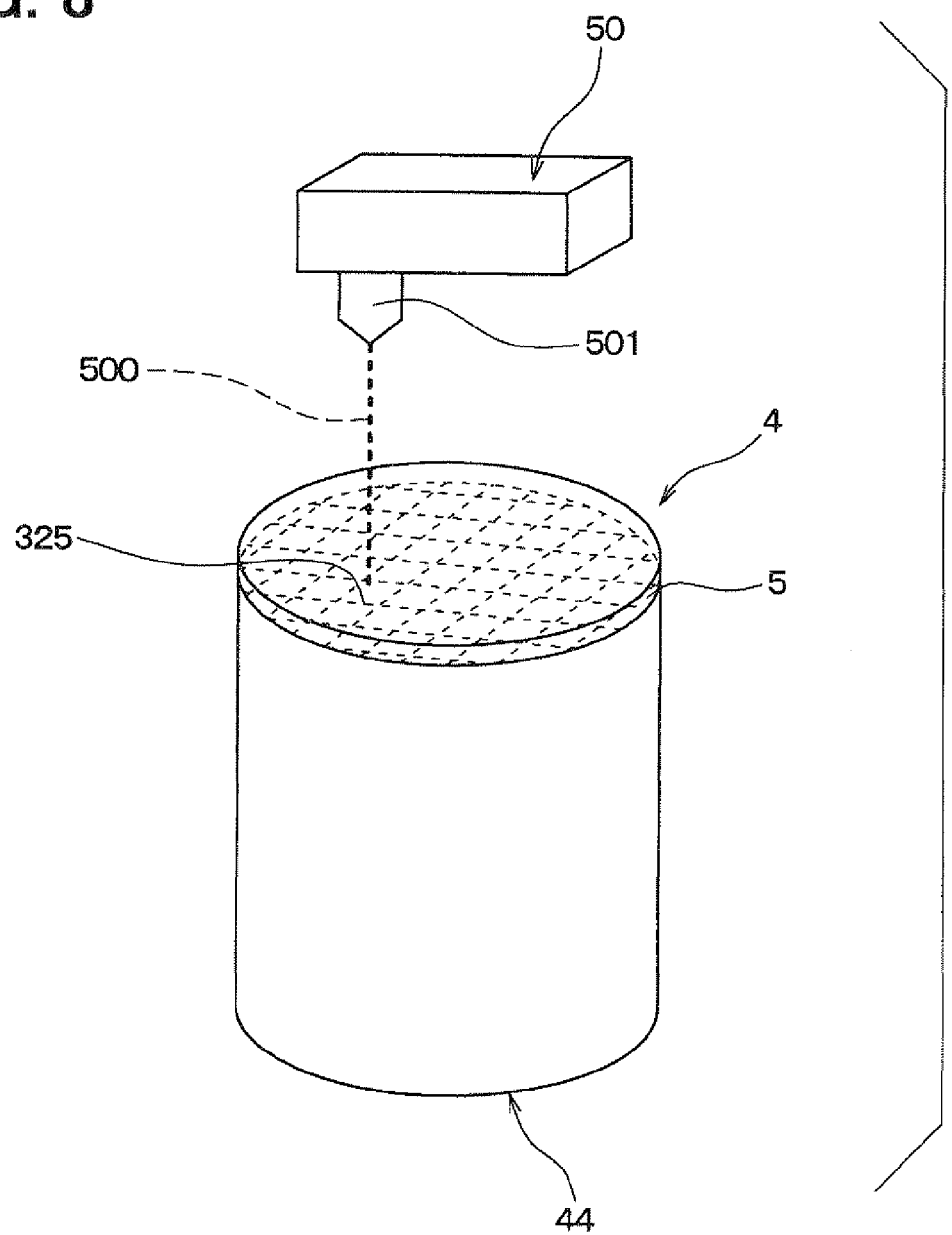
FIG. 8 is a perspective view showing a state in which through holes are to be formed in the masking tape in Example 2.
Figure 9:
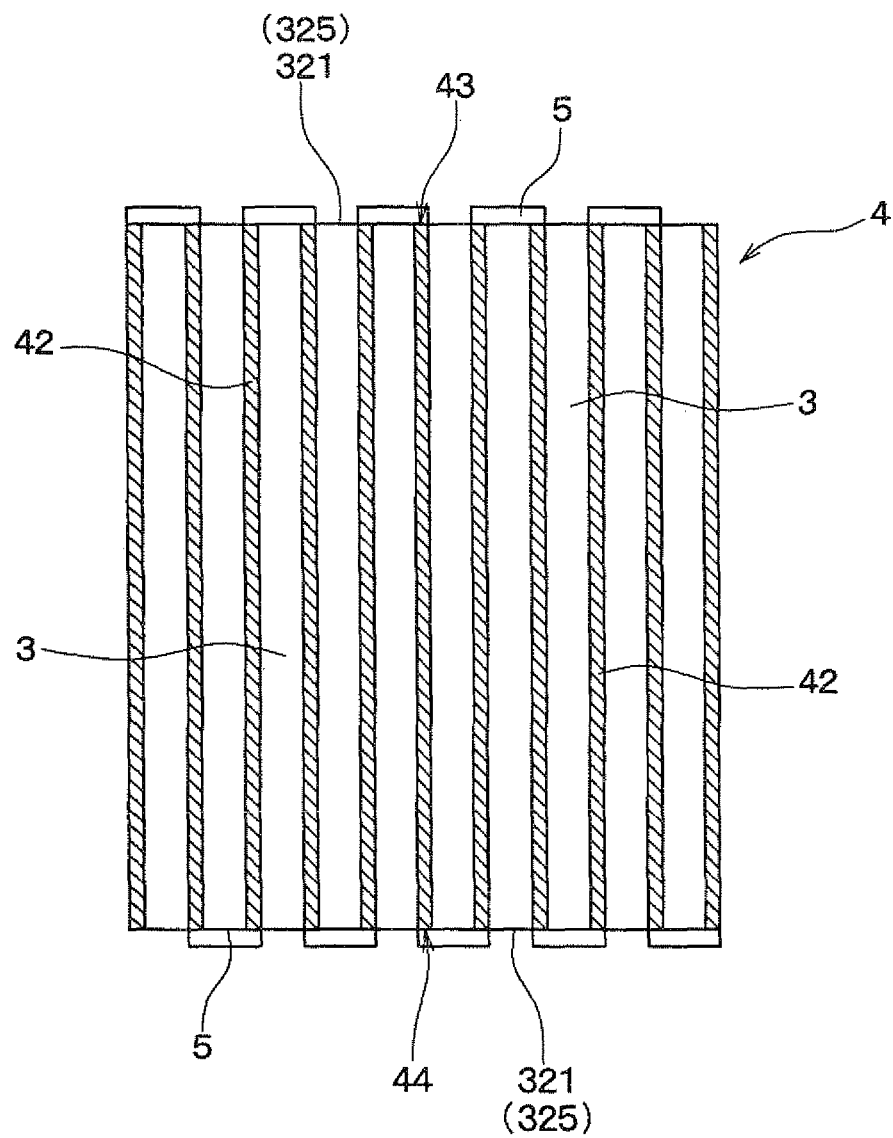
FIG. 9 is a sectional view of the honeycomb structure with through holes formed in the masking tape in Example 2.
Figure 10:
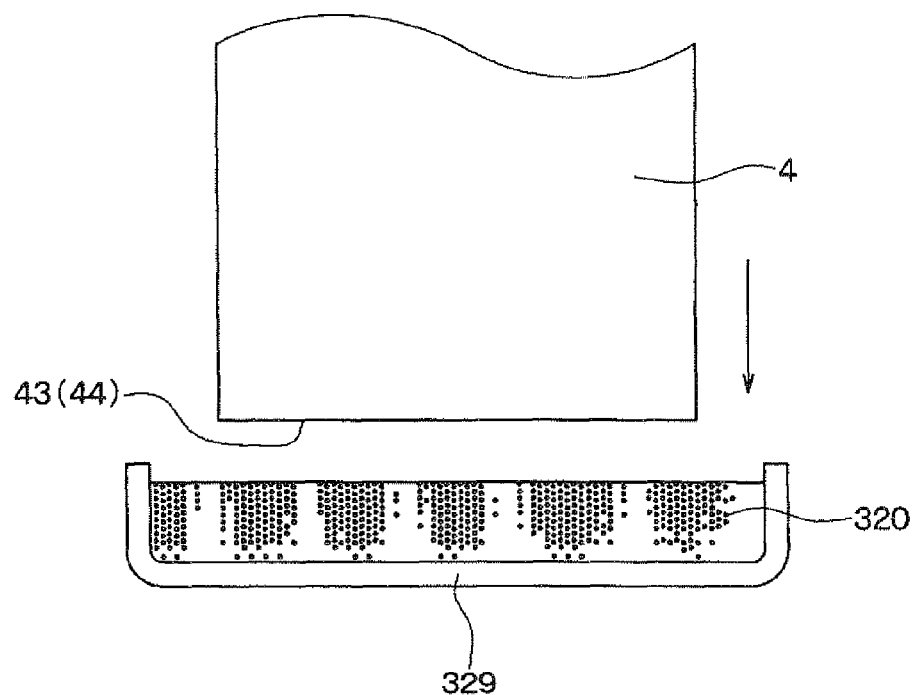
FIG. 10 is a diagram showing a state in which the honeycomb structure of Example 2 is immersed into the stopper material.
Figure 11:
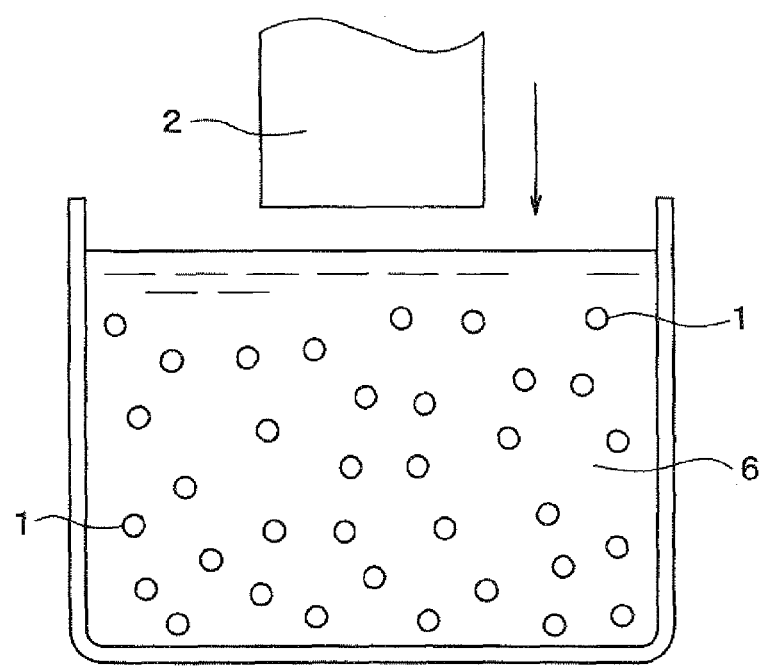
FIG. 11 is a diagram showing a state in which catalyst material is to be supported on the ceramic structure of Example 2.
Figure 12:
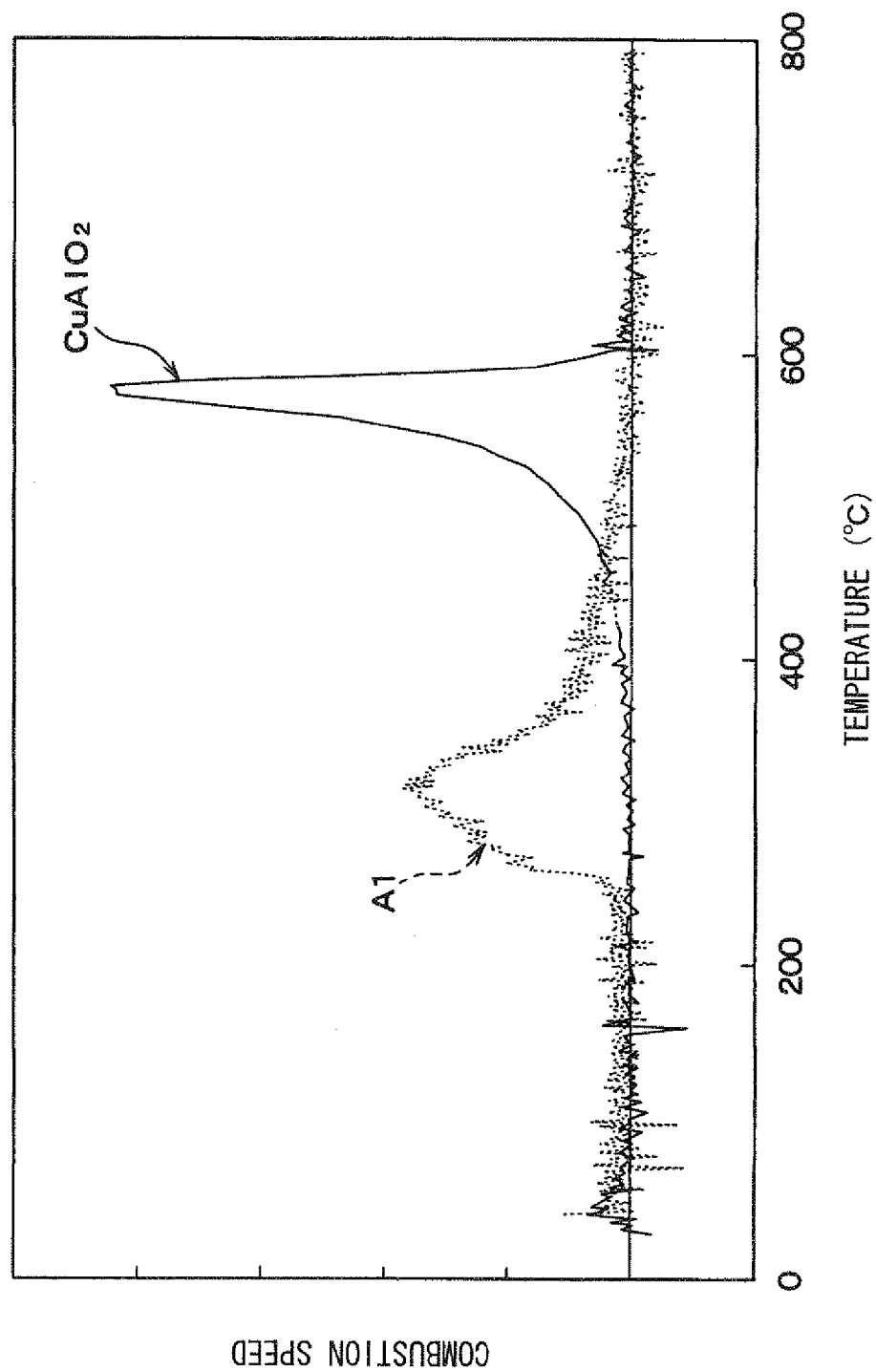
FIG. 12 is a diagram showing relationships between changes in weight and heating temperatures of the delafossite-type $AgAlO_2$ and the delafossite-type $CuAlO_2$ in Example 3.
Figure 13:
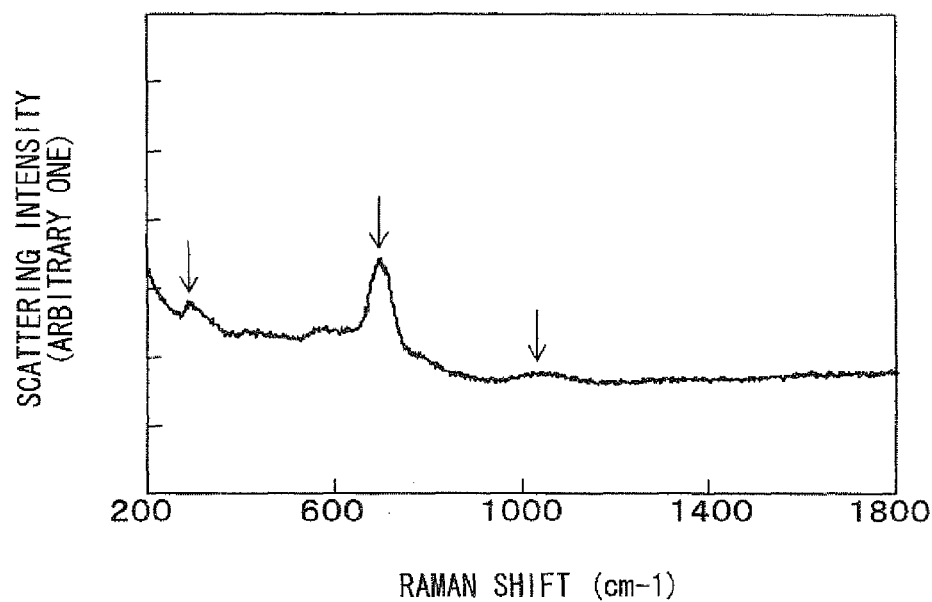
FIG. 13 is a diagram showing a Raman spectrum of a sample in a lot 1 in Example 4.
Figure 14:
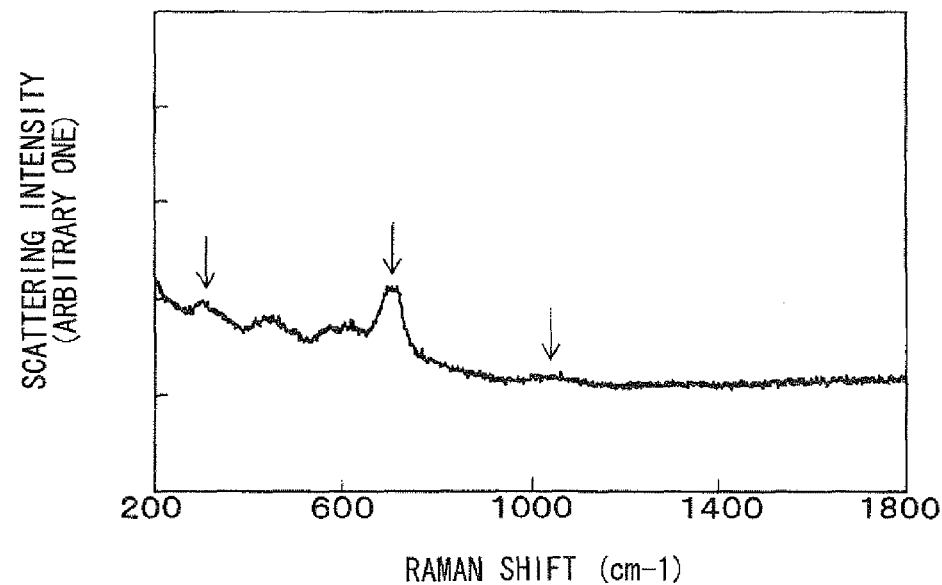
FIG. 14 is a diagram showing a Raman spectrum of a sample obtained by applying a heat treatment to the lot 1 of Example 4 at a temperature of 800° C.
Figure 15:
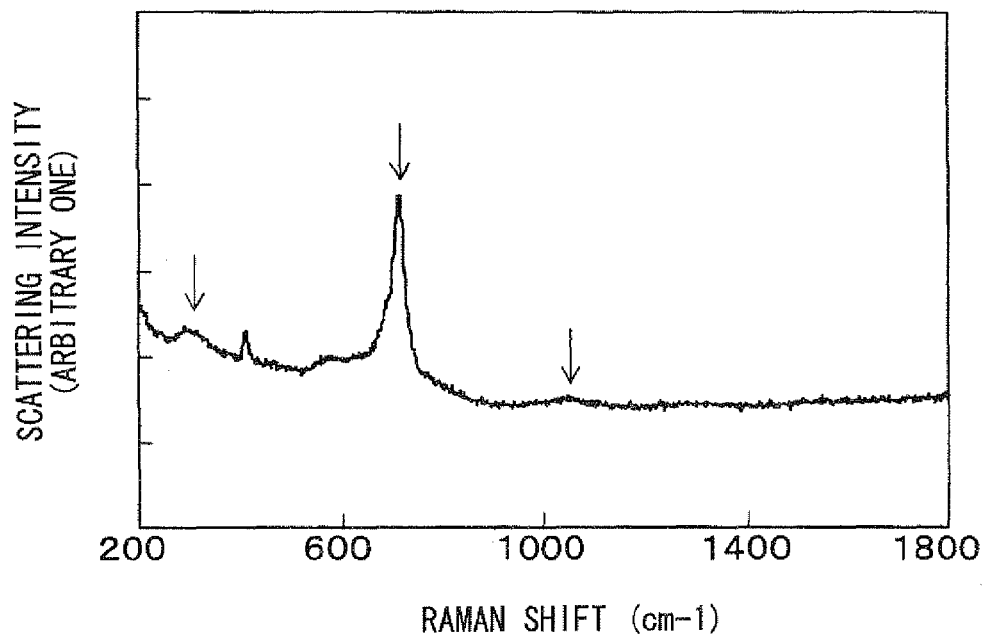
FIG. 15 is a diagram showing a Raman spectrum of a sample in a lot 2 in Example 4.
Figure 16:
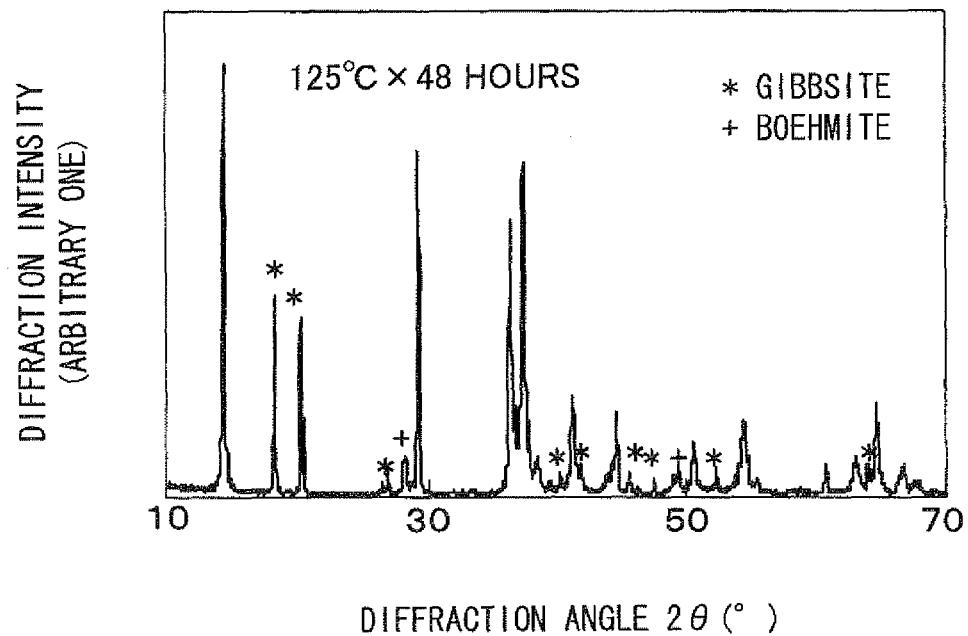
FIG. 16 is a diagram showing an X-ray diffraction spectrum of the delaffosite type $AgAlO_2$ manufactured by the hydrothermal treatment at a temperature of 125° C.
Figure 17:
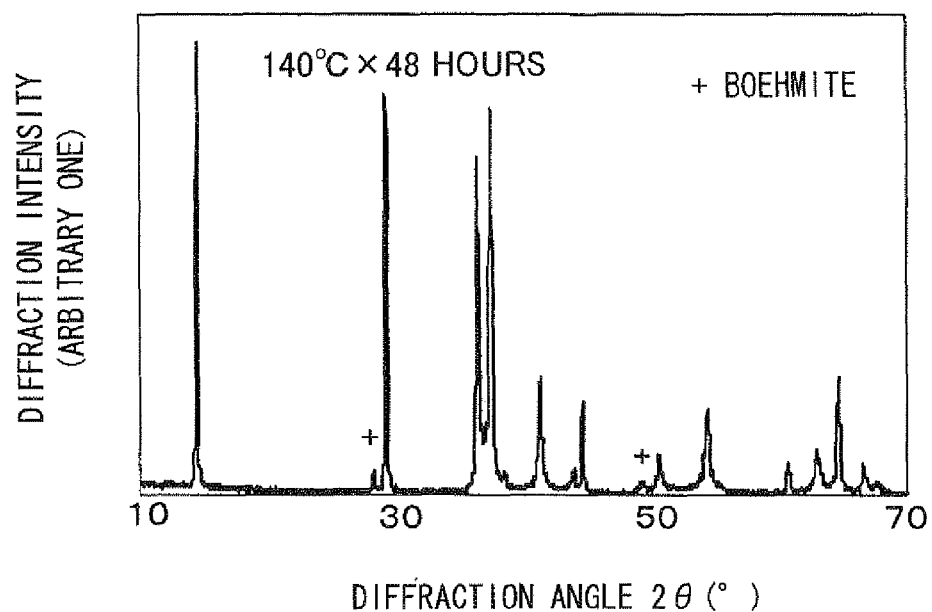
FIG. 17 is a diagram showing an X-ray diffraction spectrum of the delaffosite type $AgAlO_2$ manufactured by the hydrothermal treatment at a temperature of 140° C.
Figure 18:
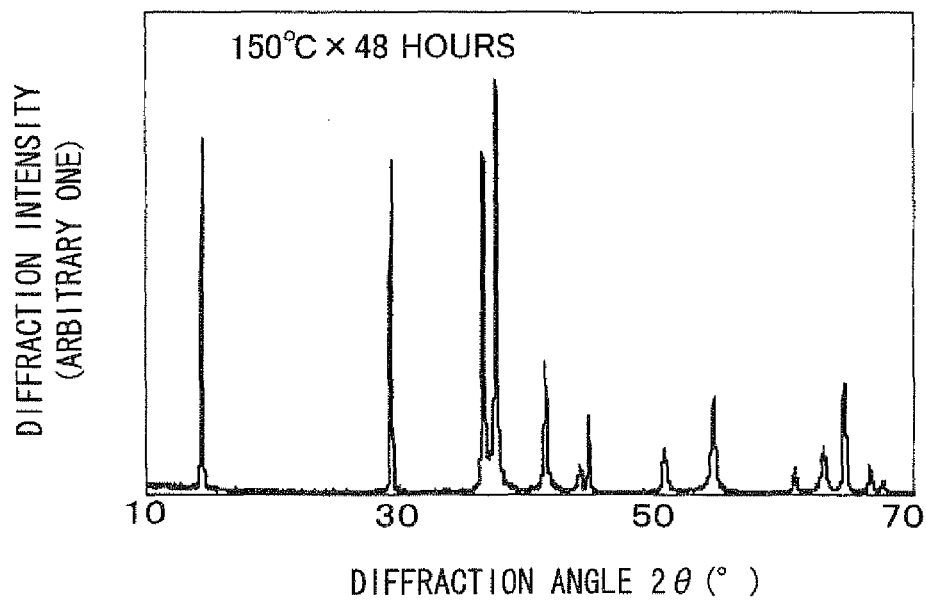
FIG. 18 is a diagram showing an X-ray diffraction spectrum of the delaffosite type $AgAlO_2$ manufactured by the hydrothermal treatment at a temperature of 150° C.
Figure 19:
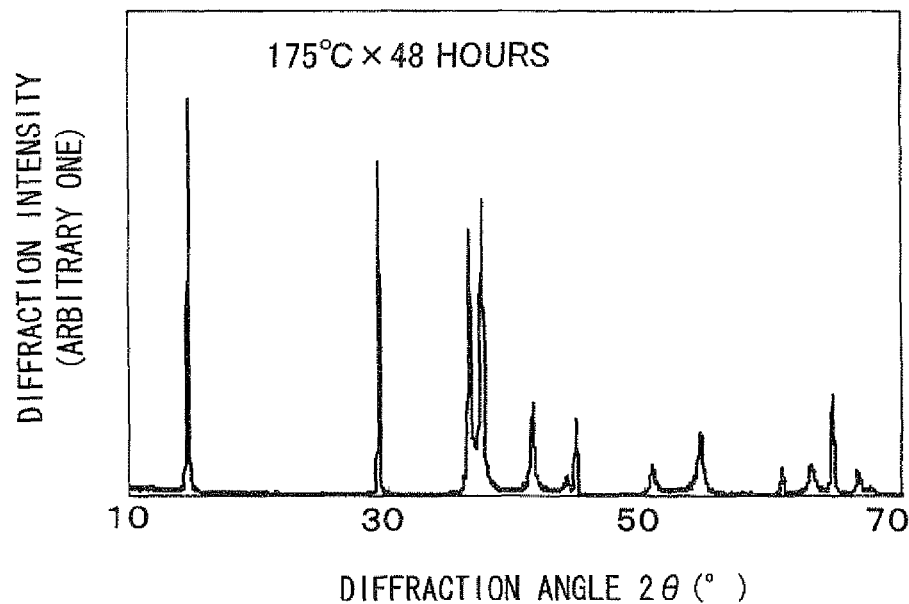
FIG. 19 is a diagram showing an X-ray diffraction spectrum of the delaffosite type $AgAlO_2$ manufactured by the hydrothermal treatment at a temperature of 175° C.
Figure 20:
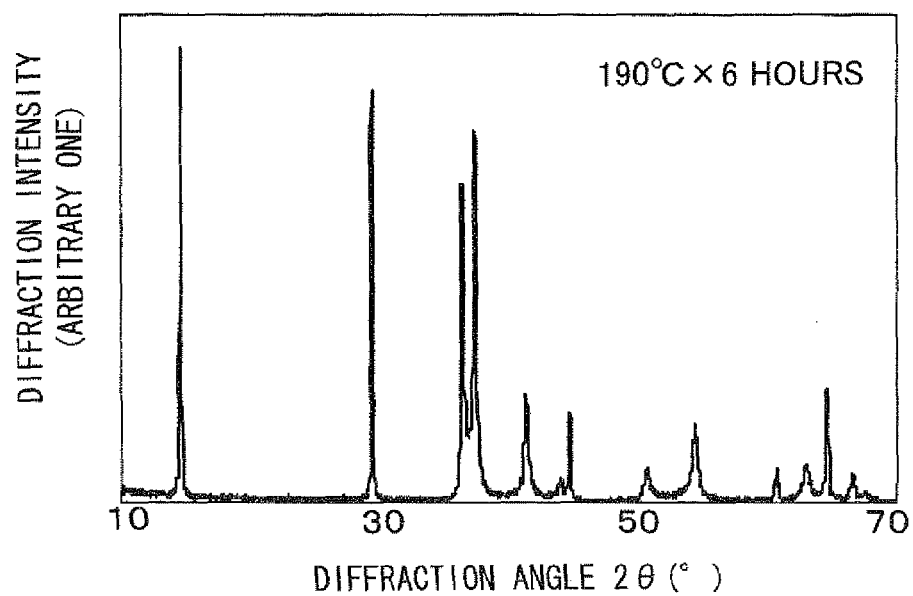
FIG. 20 is a diagram showing an X-ray diffraction spectrum of the delaffosite type $AgAlO_2$ manufactured by the hydrothermal treatment at a temperature of 190° C.
Figure 21:
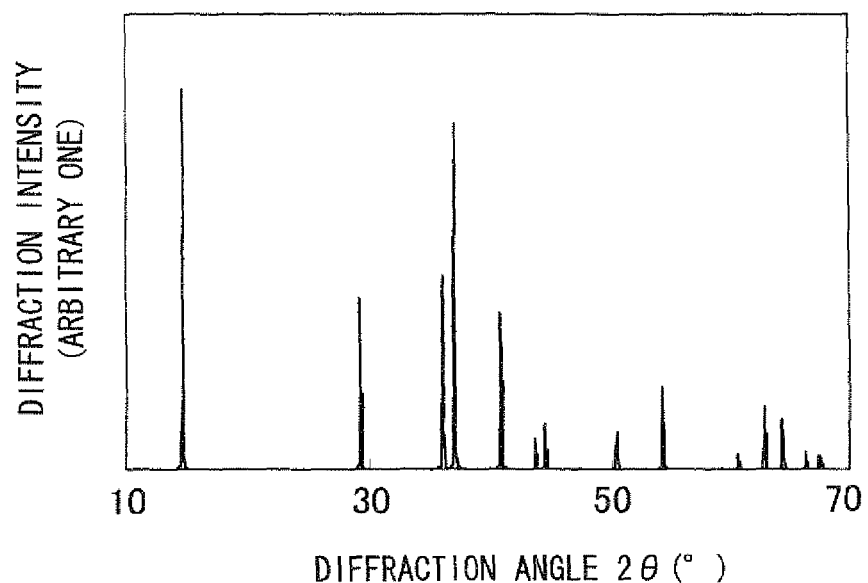
FIG. 21 is a diagram showing an X-ray diffraction spectrum of the delafossite-type $3R$—$AgAlO_2$ calculated using an atomic distance of a 2H type delafossite of ICSD#300020.
Figure 22:
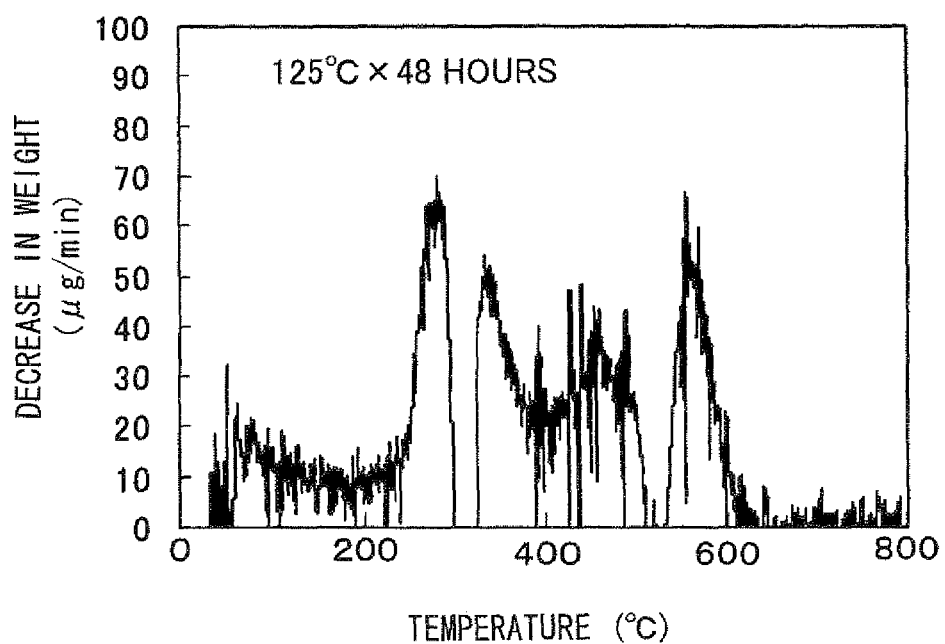
FIG. 22 is a diagram showing a relationship between a change in weight and heating temperature of the delafossite $AgAlO_2$ manufactured by the hydrothermal treatment at a temperature of 125° C.
Figure 23:
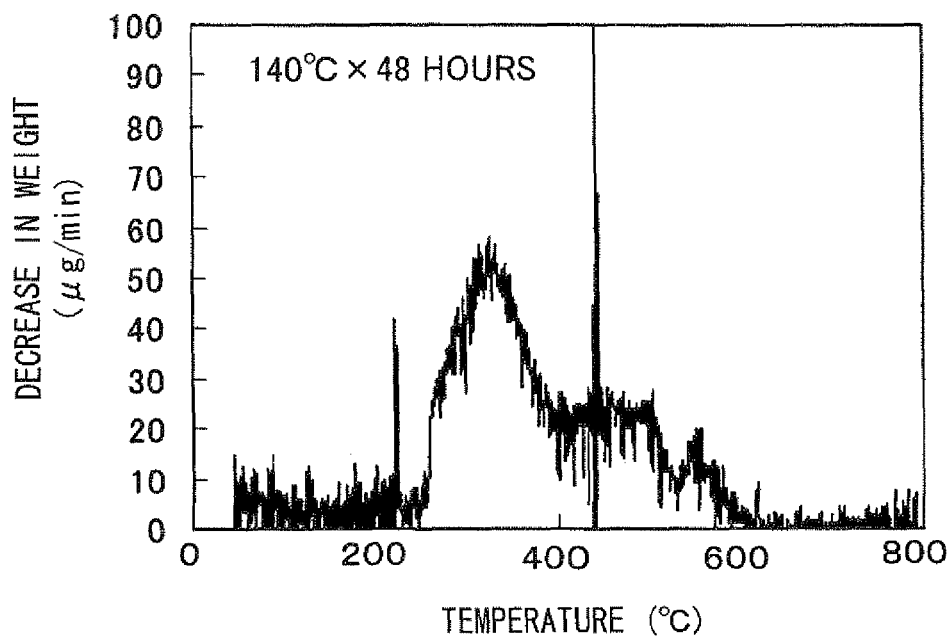
FIG. 23 is a diagram showing a relationship between a change in weight and heating temperature of the delafossite $AgAlO_2$ manufactured by the hydrothermal treatment at a temperature of 140° C.
Figure 24:
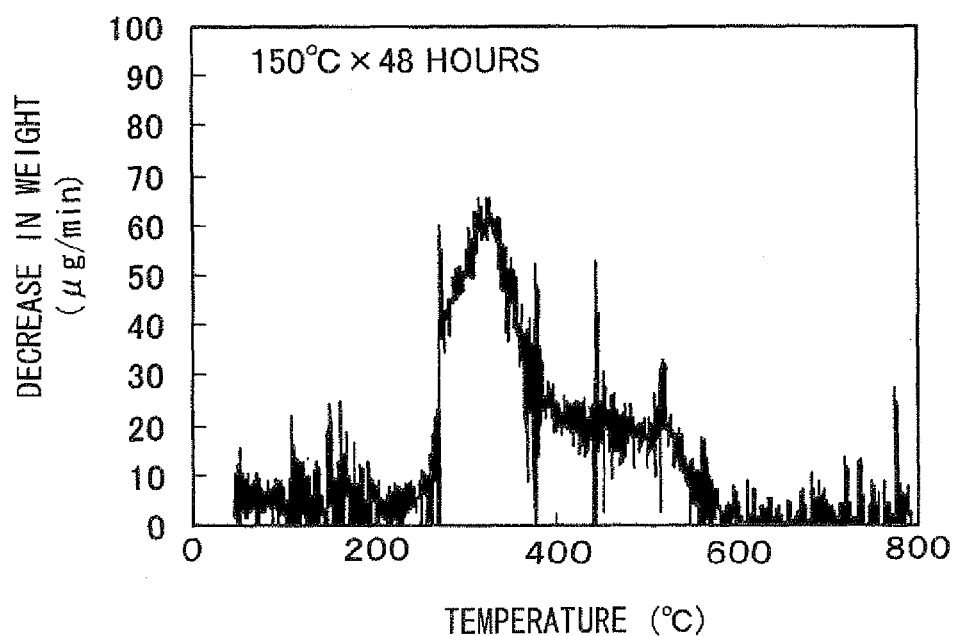
FIG. 24 is a diagram showing a relationship between a change in weight and heating temperature of the delafossite $AgAlO_2$ manufactured by the hydrothermal treatment at a temperature of 150° C.
Figure 25:
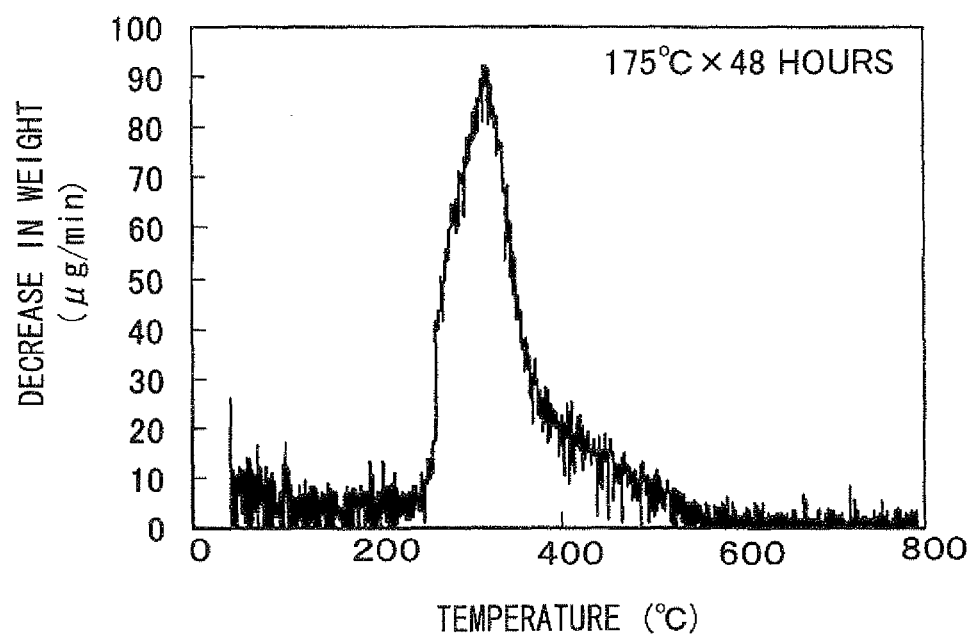
FIG. 25 is a diagram showing a relationship between a change in weight and heating temperature of the delafossite $AgAlO_2$ manufactured by the hydrothermal treatment at a temperature of 175° C.
Figure 26:
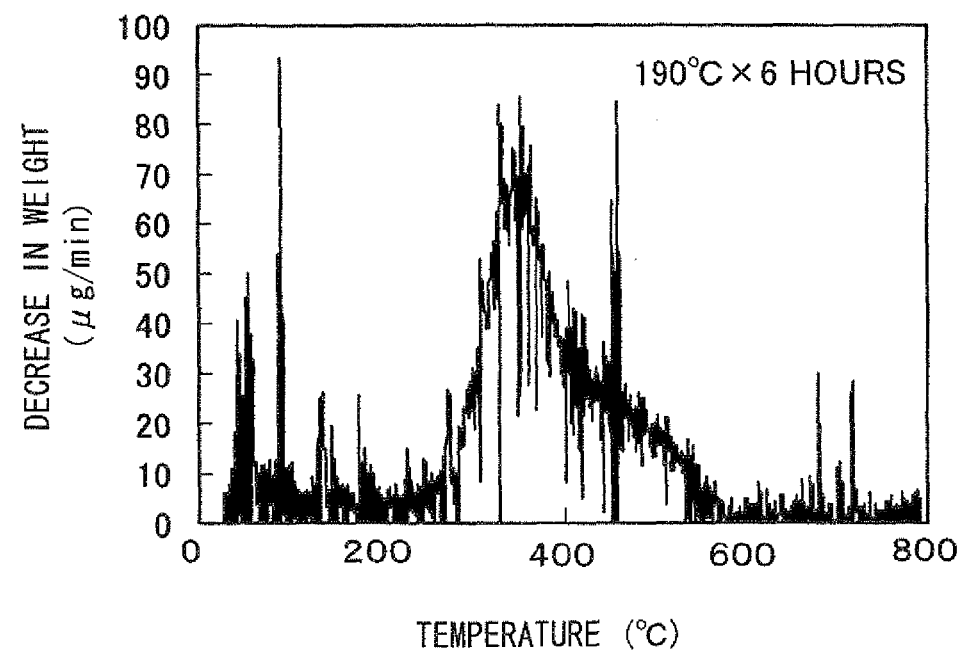
FIG. 26 is a diagram showing a relationship between a change in weight and heating temperature of the delafossite $AgAlO_2$ manufactured by the hydrothermal treatment at a temperature of 190° C.
Figure 27:
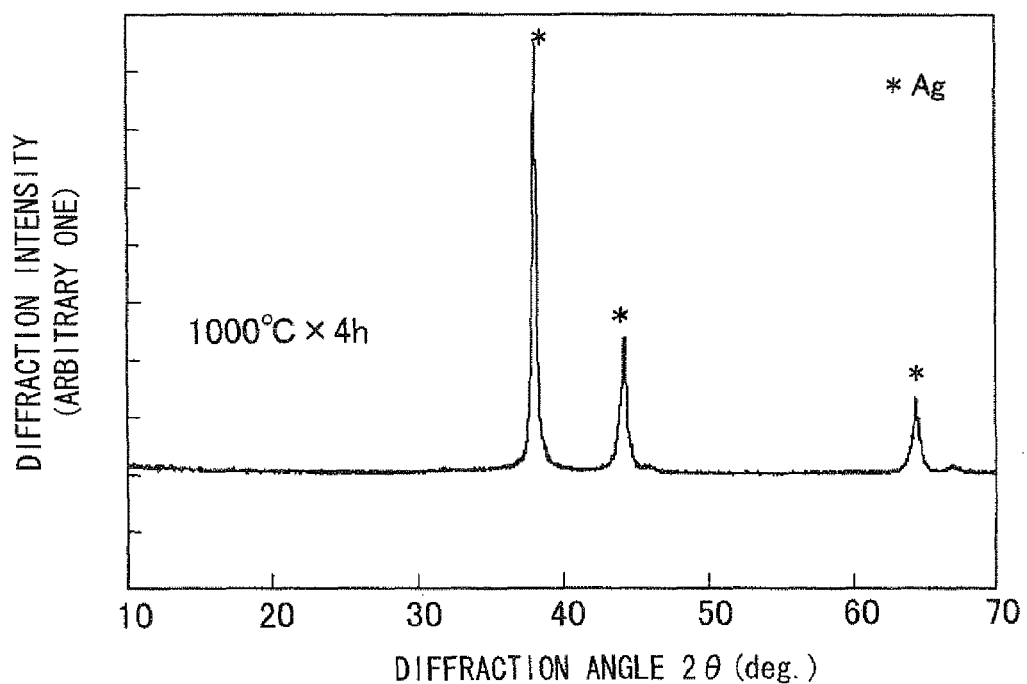
FIG. 27 is a diagram showing an X-ray diffraction spectrum of a thermally decomposed material of the delafossite $AgAlO_2$ by the XRD analysis in Example 6.
Figure 28:
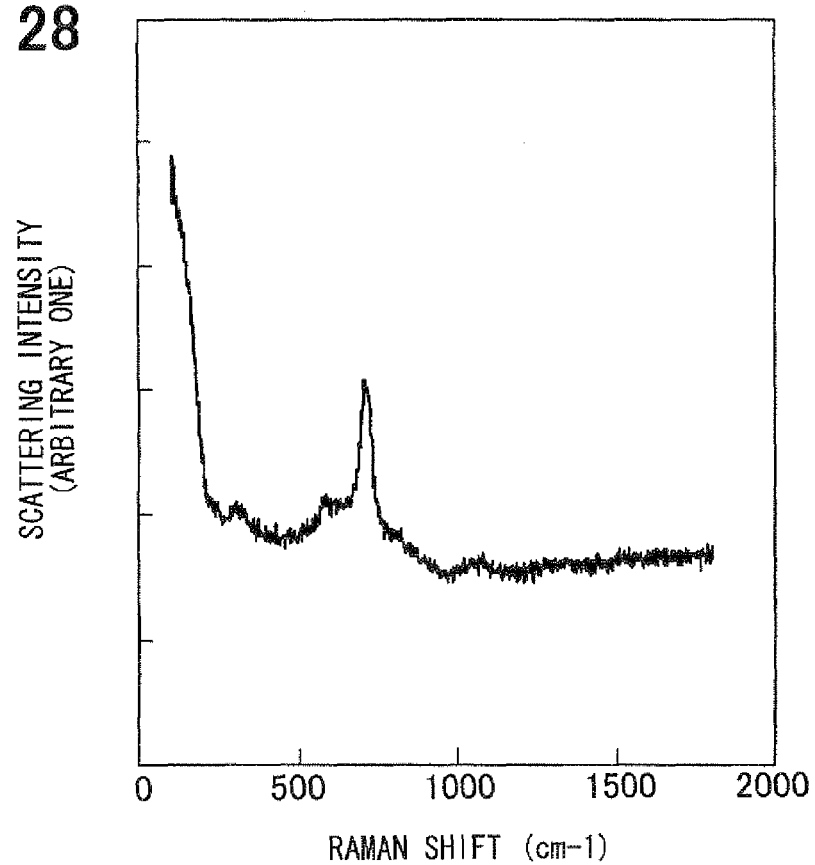
FIG. 28 is a diagram showing a Raman spectrum of the thermally decomposed material of Example 6.
Figure 29:
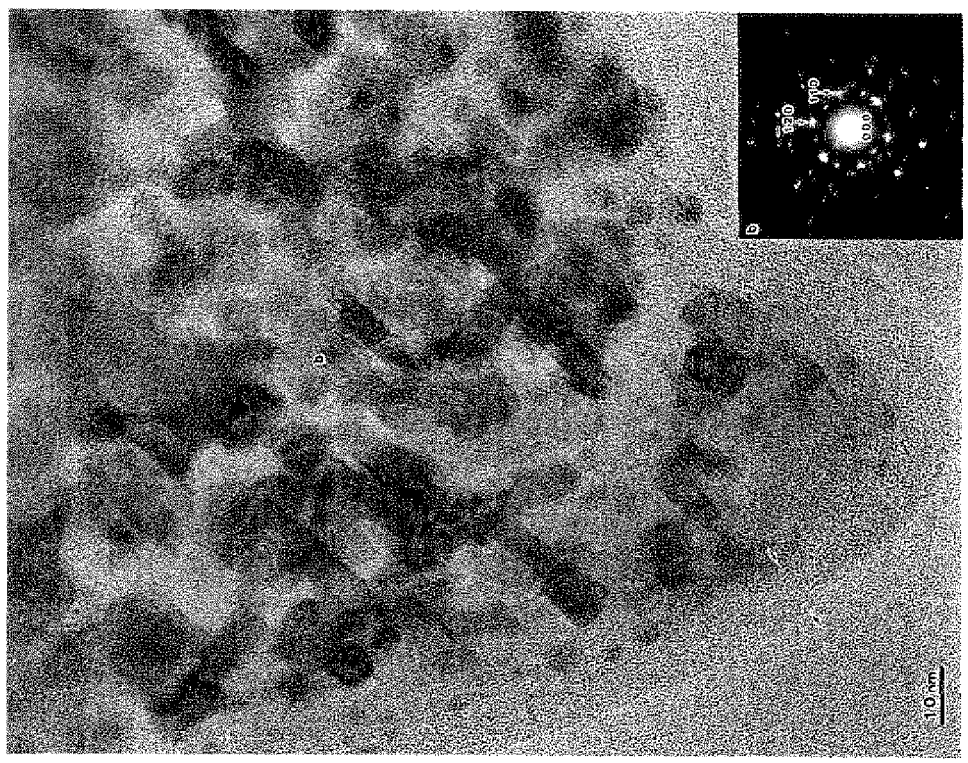
FIG. 29 is a micrograph of the thermally decomposed material taken by an electron microscope in Example 6.
Figure 30:
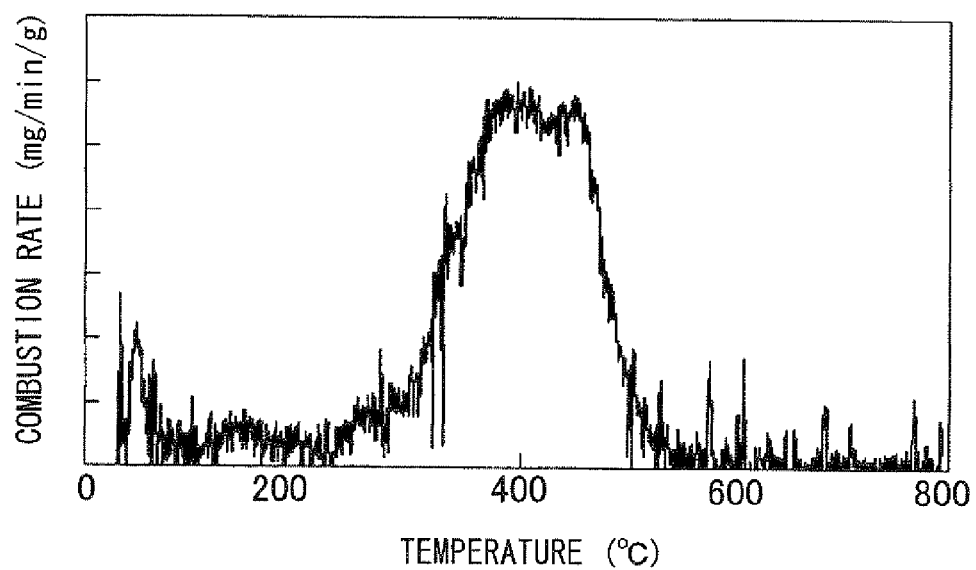
FIG. 30 is a diagram showing a relationship between a change in weight and a heating temperature of the thermally decomposed material of Example 6.
Figure 31:
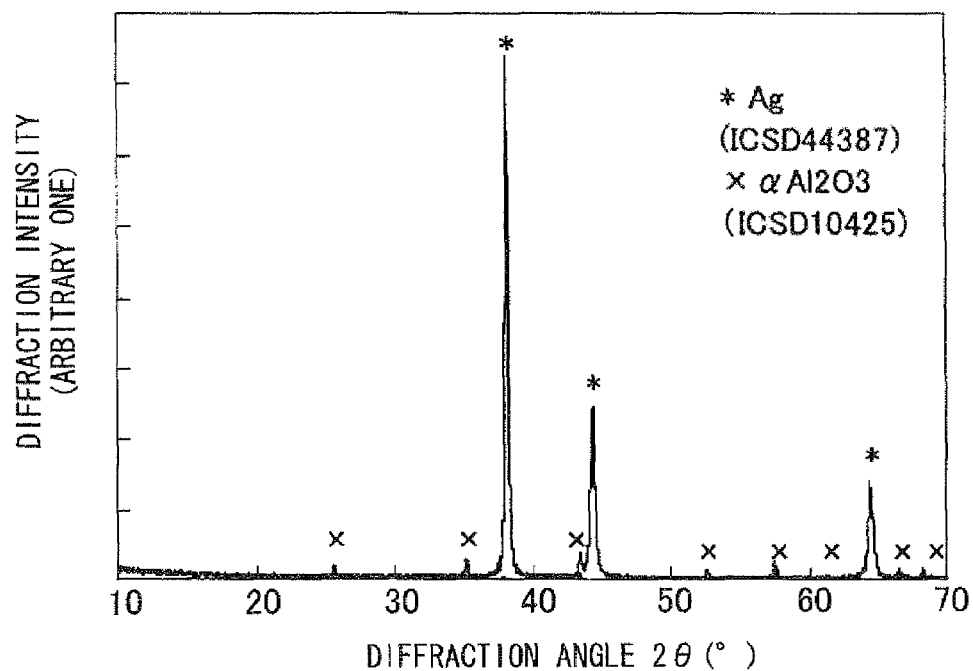
FIG. 31 is a diagram showing an X-ray diffraction spectrum of a thermally decomposed material of a composite nitrate by the XRD analysis in Example 7.
Figure 32:
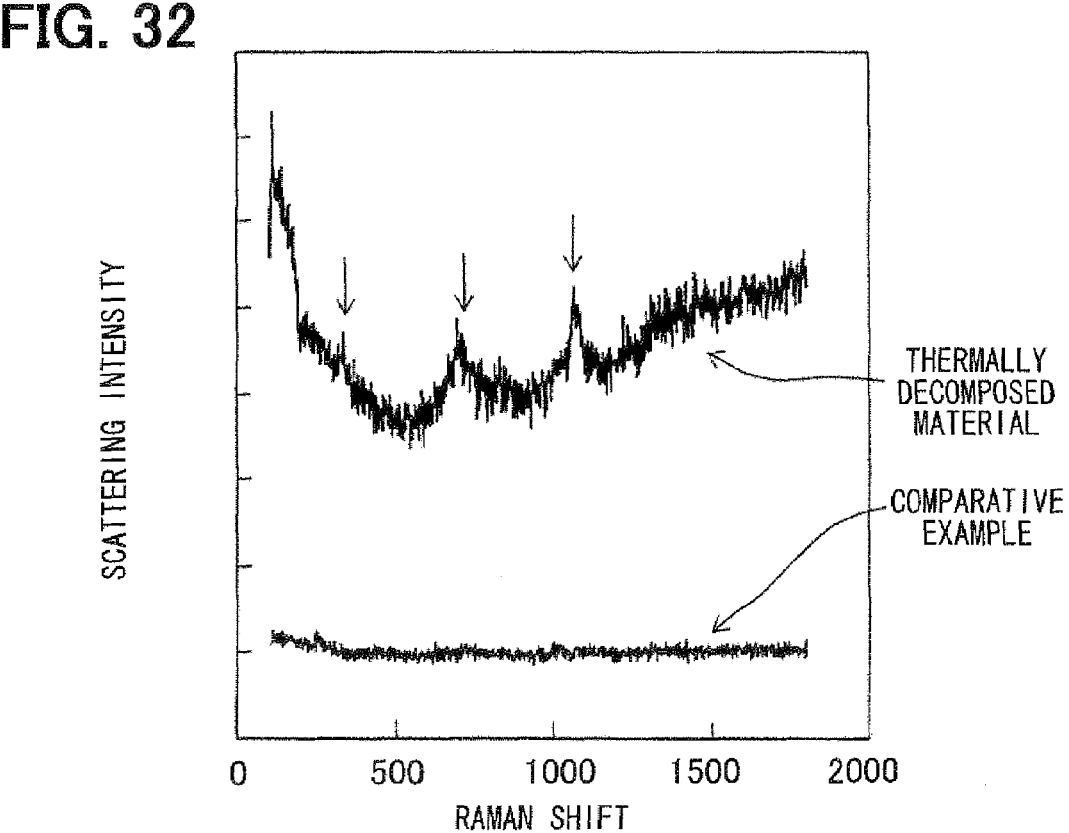
FIG. 32 is a diagram showing a Raman spectrum of the thermally decomposed material of Example 7.
Figure 33:
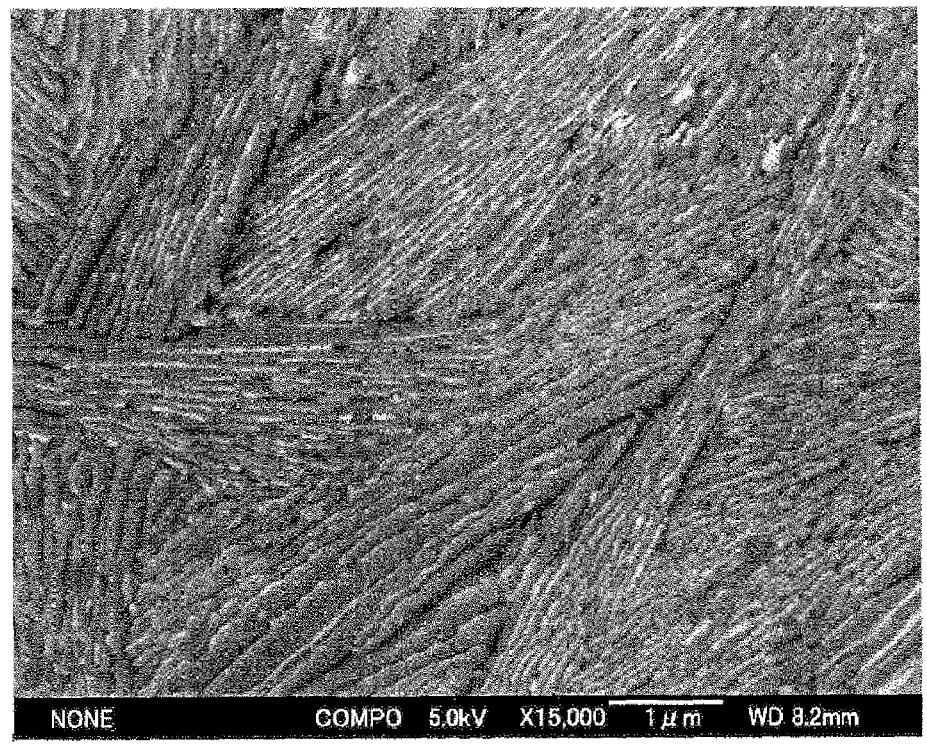
FIG. 33 is a micrograph showing the thermally decomposed material taken by the electron microscope in Example 7.
Figure 34:
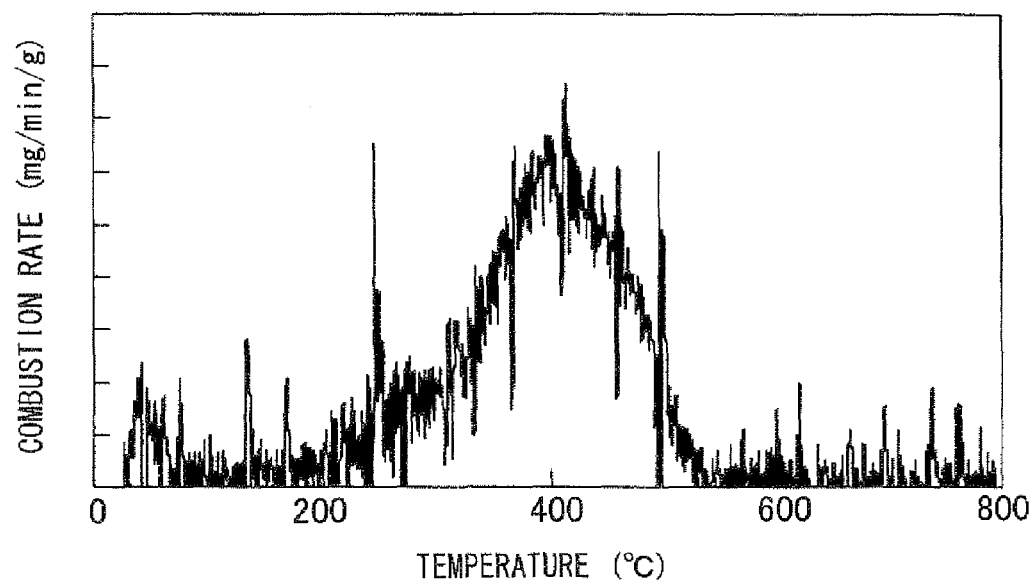
FIG. 34 is a diagram showing a relationship between a change in weight and a heating temperature of the thermally decomposed material of Example 7.
Figure 35:
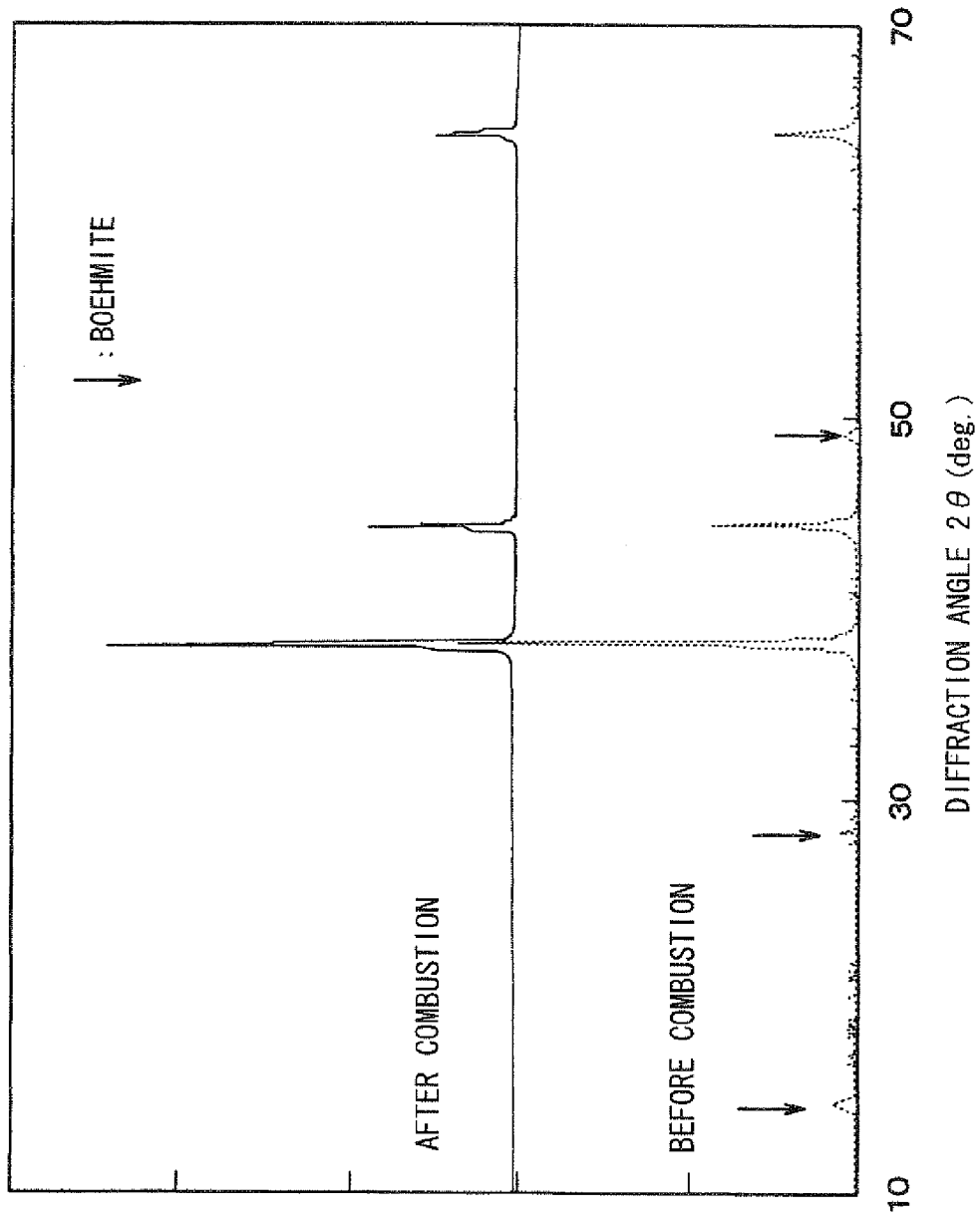
FIG. 35 is a diagram showing an X-ray diffraction spectrum of a product of Example 8.
Figure 36:
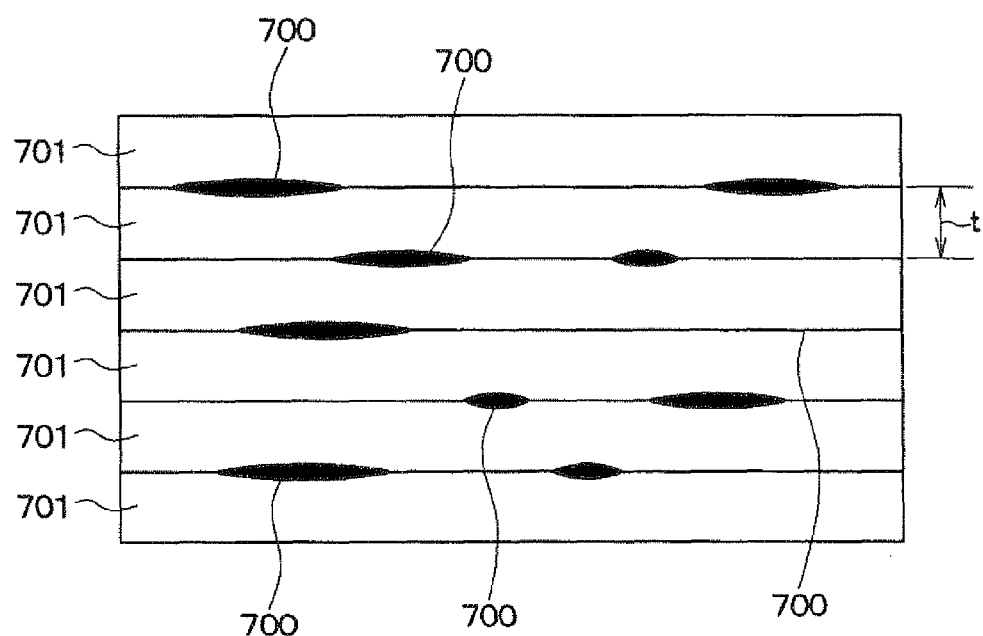
FIG. 36 is a schematic sectional view of a burned material in Example 8.
Figure 37:
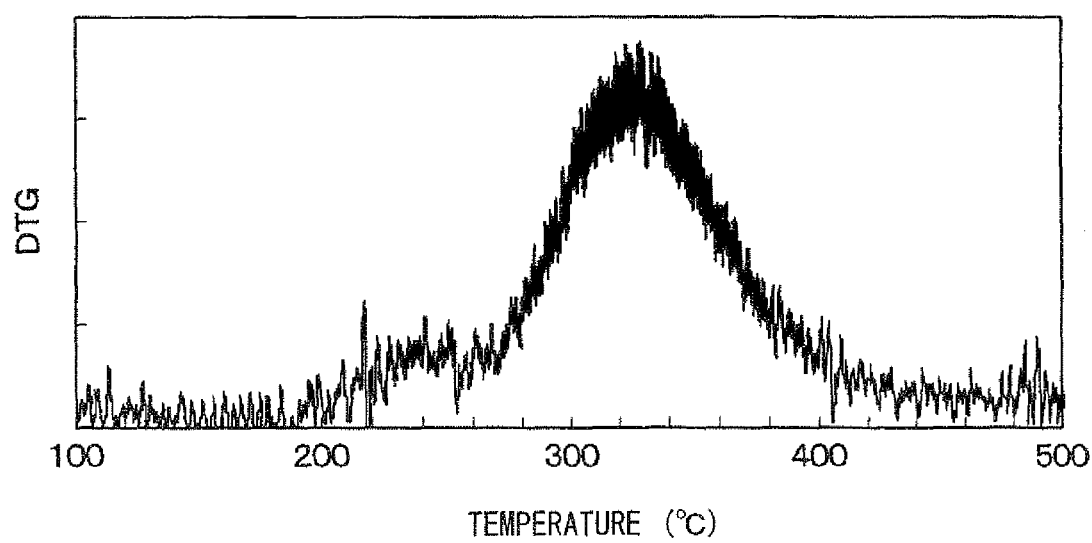
FIG. 37 is a diagram showing a relationship between a change in weight and a heating temperature of the burned material in Example 8.
Figure 38:
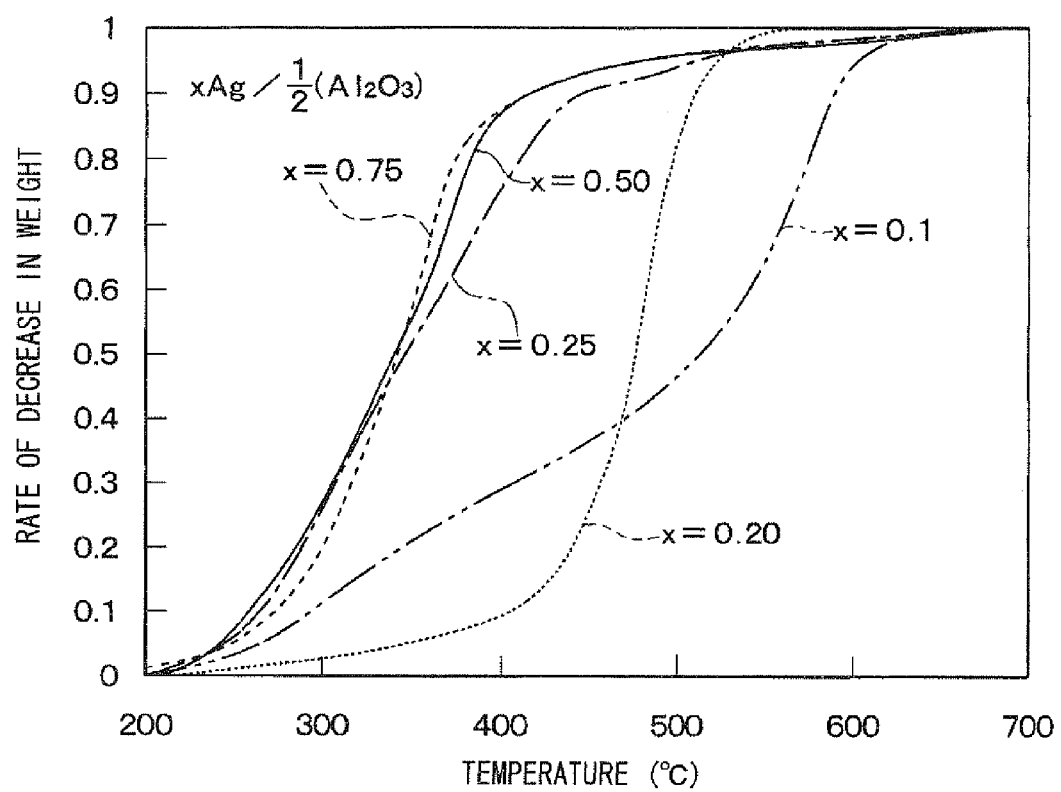
FIG. 38 is a diagram showing the result of thermogravimetric analysis in Example 13.

The invention claimed is:
1. A catalyst material to be used for burning carbon, the catalyst material including silver and alumina as components, wherein the catalyst material comprises a layered structure of at least one first layer and at least one second layer that are alternatively laminated to have a lamination cycle of 10 nm or less, the first layer being metal silver or silver ion, and the second layer being alumina containing silver.

2. The catalyst material according to claim 1, wherein, when a Raman spectrum of the catalyst material is measured, the catalyst material has at least three peaks of 200 to 400 $cm^{-1}$, 600 to 800 $cm^{-1}$, and 1000 to 1200 $cm^{-1}$.

3. The catalyst material according to claim 1, wherein the catalyst material has an X-ray diffraction spectrum with 3R symmetry which includes diffraction peaks of at least 14.5°, 29.2°, 36.1°, 37.2°, and 41.6° in X-ray diffraction using Cu—Kα.

4. The catalyst material according to claim 1, wherein the alumina is Ag-β alumina.

5. The catalyst material according to claim 1, wherein an element ratio of silver to alumina is equal to or more than 0.25.

6. The catalyst material according to claim 1, wherein an element ratio of silver to alumina is between 0.1 and 0.75.

7. The catalyst material according to claim 6, wherein the element ratio is between 0.2 and 0.75.

8. The catalyst material according to claim 7, wherein the element ratio is between 0.25 and 0.75.

9. The catalyst material according to claim 7, wherein the element ratio is between 0.5 and 0.75.

10. The catalyst material according to claim 1, wherein the lamination cycle is 5 nm or less.

11. The catalyst material according to claim 1, wherein the lamination cycle is 0.6 nm.

* * * * *